United States Patent
Yang et al.

(10) Patent No.: US 6,181,400 B1
(45) Date of Patent: Jan. 30, 2001

(54) DISCOTIC-TYPE TWIST-FILM COMPENSATED SINGLE-DOMAIN OR TWO-DOMAIN TWISTED NEMATIC LIQUID CRYSTAL DISPLAYS

(75) Inventors: Kei-Hsiung Yang, Katonah; Minhua Lu, Mohegan Lake, both of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/443,393

(22) Filed: Nov. 19, 1999

(51) Int. Cl.$^7$ .................................................. G02F 1/1335
(52) U.S. Cl. .......................... 349/117; 349/118; 349/121
(58) Field of Search ................................ 349/117, 118, 349/121

(56) References Cited

U.S. PATENT DOCUMENTS

| | | | |
|---|---|---|---|
| 4,378,955 | 4/1983 | Bleha, Jr. et al. | 350/334 |
| 5,326,496 | 7/1994 | Iida et al. | 252/299.01 |
| 5,519,523 | 5/1996 | Madokoro et al. | 359/73 |
| 5,526,150 | 6/1996 | Mazaki et al. | 359/73 |
| 5,548,426 | * 8/1996 | Miyashita et al. | 359/73 |
| 5,638,197 | 6/1997 | Gunning, III et al. | 349/96 |
| 5,745,206 | * 4/1998 | Koike et al. | 349/129 |
| 5,767,937 | * 6/1998 | Sumiyoshi | 349/119 |
| 5,796,456 | * 8/1998 | Takatori et al. | 349/117 |
| 5,825,445 | * 10/1998 | Okamoto et al. | 349/118 |
| 5,855,971 | * 1/1999 | Kobori et al. | 428/1 |
| 5,883,685 | 3/1999 | Mazaki et al. | 349/117 |
| 5,895,106 | * 4/1999 | VanderPloeg et al. | 349/120 |
| 5,926,241 | 7/1999 | Gunning, III et al. | 349/117 |
| 5,940,155 | * 8/1999 | Yang et al. | 349/120 |
| 5,990,997 | * 11/1999 | Jones et al. | 349/120 |

OTHER PUBLICATIONS

Optical Performance of the π Cell Compensated with a Negative Birefringence Film & an A–Plate; H. Mari & P. J Bos. Jpn. J. Appl Phys., vol. 39 (1999) Pt 1. No. 5A, pp. 2837–2844.

Voltage–Dependent Optical Activity of a Twisted Nematic Liquid Crystal by M Schadt & W. Helfrich; Applied Physics Letters, vol. 18, No. 4, Feb. 15, 1971.

18.5: Late News Paper: 33–cm Diagonal Full–Color Wide–Vieweing Angle C–TN LCOS for Use in a Work Station; T. Suzuki et al SID 94 Digest; pp. 267 to 270.

The Twisted Nematic Effect: Liquid Crystal Displays & Liquid Crystal Materials by M. Schadt; 2322 Molecular Crystals & Liquid Crystals Incorporating Nonlinear Optics 165(1998) Dec. Chur., CH.

Liquid Crystal pp. 1–4—Source Unknown.

U.S. patent application, Ser. #08/922,251 Nakamura, Sep. 2, 1997.

* cited by examiner

Primary Examiner—Kenneth Parker
Assistant Examiner—Mike Qi
(74) Attorney, Agent, or Firm—J. Sbrollini

(57) ABSTRACT

A twist discotic-type liquid-crystal or liquid-crystalline film with negative birefringence is as a compensation film for either single-domain or two-domain liquid crystal display cells to achieve better view-angle characteristics, less color-shift as a function of applied voltage, and faster response times than uncompensated 90°-twist single-domain or two-domain cells.

30 Claims, 19 Drawing Sheets

Incident light ne' < no' ne > no

DISCOTIC-TYPE TWIST-FILM COMPENSATED SINGLE-DOMAIN OR TWO-DOMAIN TWISTED NEMATIC LIQUID CRYSTAL DISPLAYS

FIELD OF THE INVENTION

The present invention is concerned with the design of liquid crystal (LC) displays (LCDs) and, particularly, with techniques for maximizing the field of view (or viewing angle) of LCDs by maintaining high contrast ratio viewing from near normal incidence and minimizing variance in relative gray levels over a wide range of viewing angles.

BACKGROUND OF THE INVENTION

A liquid crystal (LC) cell, in general, consists of two substrates forming a cavity between them to contain the nematic LC mixture. Between each substrate and the LC medium, there exist both a conductive electrode coated on the substrate and a LC alignment layer in direct contact with the LC medium to align the adjacent LC directors into one direction. For a TN LC cell, the direction of the LC directors adjacent to one of the substrates is orthogonal (or 90°) to the direction of LC directors adjacent to the other substrate so that the LC directors in the cell twist 90° from one substrate to the other. In the quiescent state, the director of the TN cell twists continuously from 0 to 90° within the LC cell. To the first approximation, the $d\Delta n$ value (where d is the cell gap and $\Delta n$ is the birefrigence of the LC medium within the cell) of the TN cell is chosen in such a way that if an incident light beam polarized along the entrance LC director, its polarization direction at any given point within the LC cell is parallel to the nematic LC director at that point. In other words, the polarization of the incident light is guided by the LC director within the TN cell so that the output polarization is rotated 90° with respect to the incident polarization. For display applications, the TN cell is placed between two polarizers with the transmitting axes of the polarizers either parallel or perpendicular to the adjacent LC directors. If the transmitting axes of the two polarizers sandwiching the TN cell are crossed to each other, we operate the TN display in a normally-white case where the quiescent state of the TN cell is the bright state of the display. On the other hand, if they are parallel to each other, we operate the TN display in a normally-black case where the quiescent state of the TN cell represents the dark state.

Because of their maturity in manufacture and their sufficiency in performance, TN liquid crystal (LC) displays have been widely used in commercial thin-film-transistor (TFT) driven flat panel liquid crystal displays (LCDs). The strong viewing-angle dependence of the contrast ratio, the brightness, and the grayscale of the TFT-driven TN have been recognized as major weaknesses for these displays. To illustrate the viewing-angle problem of the TN LC cells, we have to define a TN orientation with different viewing directions.

FIG. 1 shows a TN liquid crystal display 10 with two substrates 12 and 14. A rubbed polyimide film (not shown in FIG. 1) is usually used to align the LC directors. The rubbing directions of the polyimide films on substrates 12 and 14 are shown as dashed arrow 16 and solid arrow 18, respectively. For display applications, the TN is placed between two polarizers 20 and 22 with the transmitting axes of the polarizers being either parallel or perpendicular to adjacent LC directors. If the transmitting axes of 24 and 26 of the two polarizers sandwiching the TN LCD are crossed to each other, the LCD is operated in the normally-white mode where the quiescent state of the LCD cells is the bright state of the display. On the other hand, if the axes 24, 26 are parallel to each other, the LCD cells are operated in the normally-black mode. For the normally-white case, there are two optical eigen modes, the ordinary-ray (o-) and the extra-ordinary-ray (e-) modes, in which the optical field propagates either parallel or perpendicular to the nematic LC directors in the TN cell, respectively. Such e- and o-modes are illustrated in FIG. 1 where the transmitting axes of the polarizers 20 and 22 are shown.

With the configuration of the TN display shown in FIG. 1, by facing the display, we can define four viewing zones, the upper viewing zone for viewing from the 12 o'clock direction, the lower viewing zone for viewing from the 6 o'clock direction, the left viewing zone for viewing from the 9 o'clock direction, and the right viewing zone for viewing from the 3 o'clock direction. The sign of the angles for the upper and right viewing zones are positive while those for the lower and left viewing zones are negative. Traditionally, the o-mode has been used for bi-level displays. Recently, Takano et al have carried out a detailed comparison between the o- and e-modes of NW, first-minimum TN cells for analog-gray scale full color displays (H. Takano, M. Ikezaki, and S. Suzuki "Threshold Voltage Biased E-mode TN LCD-Optimum Optical Design for Grayscale Application," the IV International Topical Meeting on Optics of Liquid Crystals, Oct. 7–11, 1991, Cocoa Beach, Fla.). They paid particular attention to optimizing the angular region that preserves a proper grayscale order (no grayscale reversal), i. e., minimizing the angular region of grayscale reversals for ratios of eight gray levels. They concluded that the e-mode with a near threshold-voltage bias is superior to the o-mode for analog-gray scale applications. The following discussion of FIGS. 2 to 5 is in reference to the e-mode. However, the results are applicable to the o-mode as well.

To illustrate the viewing-angle problem of TN for analog-gray scale displays, We show transmittance as a function of applied voltage for a typical TN cell in FIG. 2 when the TN cell is being viewed from five different directions. Curves 1, 2, 3, 4 and 5 in FIG. 2 correspond to viewing from normal incidence, 40° from left viewing zone, 50° from right viewing zone, 30° from lower viewing zone, and 30° from upper viewing zone, respectively, where the angles in degrees are defined as the angles of viewing directions with respect to the normal of the display panel. FIG. 2 illustrates that, at a given voltage applied to the TN cell, the brightness (or the contrast ratio) of the display appears different from above mentioned five different viewing directions.

To further quantify the viewing-angle problems of a typical TN cell, we select eight different voltage levels applied to the TN cell to achieve eight approximately equally-spaced gray levels starting from the brightness to the darkest states of the display. The change of these eight levels as a function of viewing angles in the horizontal and vertical viewing directions are shown in FIGS. 3 and 4, respectively, for a typical TN cell. As shown in FIG. 3, at a horizontal viewing angle of either +40° or −40°, the transmittance of the gray level 8 (the darkest level near normal incidence) is higher than that of the gray level 7. Therefore, we have contrast or gray-level reversal between gray level 8 (g8) and gray level 7 (g7) for these viewing directions. The display will appear annoying if a grayscale reversal occurs between any two gray levels from level 1 to level 8. FIG. 5 shows iso-contrast curves as a function of viewing angle for a typical TN display. We can see that the contrast ratio decreases when the viewing angle further deviating from normal incidence. The TN cell usually has the best contrast ratio near normal incidence. FIG. 5 also shows that, outside the thick solid curves, image (or grayscale) reversal occurs so that display appears annoying when it is viewed from those viewing zones having image reversals.

The narrow viewing-angle characteristics of a TN cell are caused by the dark state whose effective retardation changes when the viewing direction is changed away from normal incidence. To the first degree of approximation, the retardation of a nematic LC cell at normal incidence under any applied voltage V is proportional to $d\Delta n(V)$ where d is the cell gap and $\Delta n(V)$ is the birefringence of the LC medium under an applied voltage V. The transmission of this state between crossed polarizers is proportional to the square of $\sin(\pi\ d\Delta n(V)/\lambda)$, where $\lambda$ is the wavelength of the incident light. To accomplish a contrast ratio larger than 200 to 1 at normal incidence, the value of $\pi\ d\Delta n(V)/\lambda$ should be less than about 0.07. When the LC cell is viewed from an oblique direction, the retardation becomes either larger or smaller than that at normal incidence so that it may become either brighter or dimmer than that at normal incidence, resulting in viewing the same gray level with different brightness depending on the viewing directions.

Many prior art systems use compensation films attached on TN cells of LCDs to reduce the dependence of effective birefringence as a function of viewing angle, i. e., reducing the variance in relative gray levels over a wide range of viewing angles. However up until now, the compensation mechanisms that have been proposed have been lacking in many respects.

SUMMARY OF THE INVENTION

In accordance with the present invention, wide-viewing-angle LCDs using 90°-twist single-domain or two-domain TNs are achieved by using twisted discotic films made of discotic liquid crystals or discotic liquid crystalline polymers with negative birefringence to compensate in such single-domain or a two-domain TN cells. These LCDs have wide viewing angles; require low operating voltages, exhibit low color-shift as a function of applied voltage; and has fast response time.

Therefore, it is an object of the invention to provide improved viewing characteristics for LCD screens.

It is another object of the invention to provide viewing wide angle displays that requires low operating voltages; exhibits low color shift as a function of applied voltage; and have fast response times.

BRIEF DESCRIPTION OF THE DRAWINGS

These and other objects, features and aspects of the present invention can best be understood by reading the following detailed description of the embodiments of the invention while referring to the accompanying figures of which.

DETAILED DESCRIPTION

Figure 1:
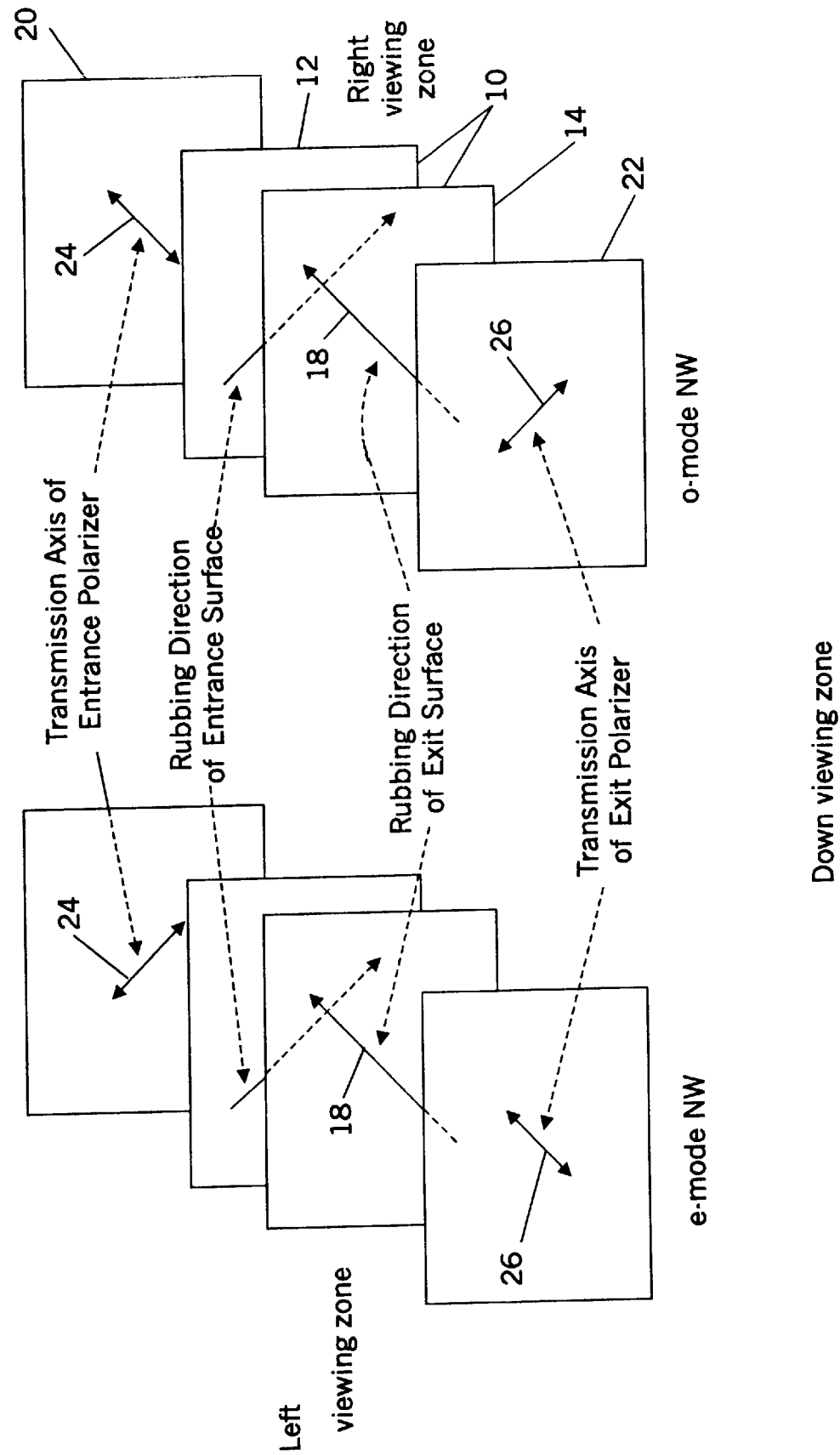
FIG. 1 is a schematic diagram that shows the structure of a TN display operated in the normally-white case having extraordinary (e-) and ordinary (o-) modes. The orientation of the TN cell is chosen to define the left, the right, the upper, and the lower viewing zones.
Figure 2:
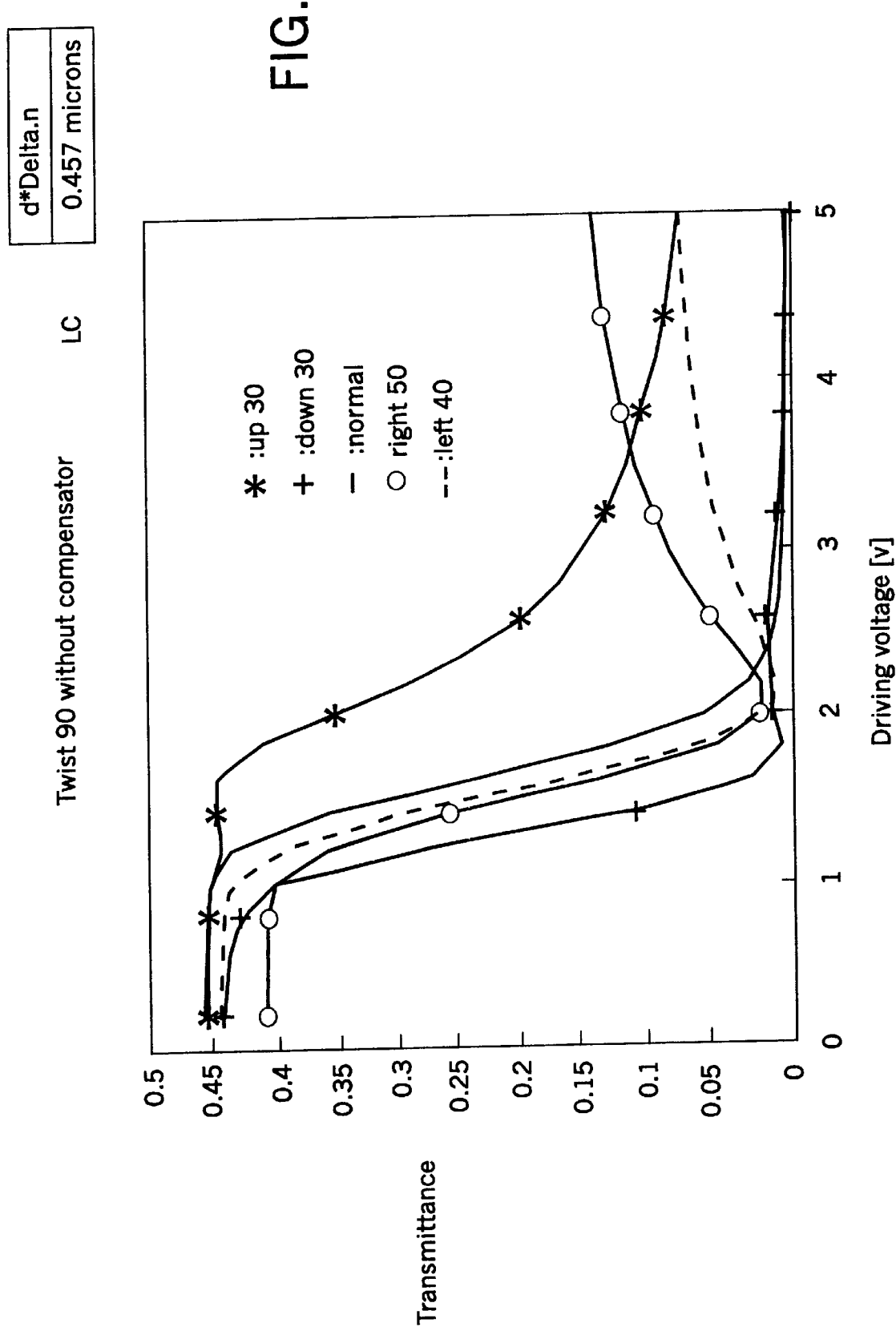
FIG. 2 is a graph that shows the transmittance-versus-applied voltage curves for a TN cell using five different viewing direction as parameters. It shows that the contrast ratio of the TN cell depends strongly on the viewing direction.
Figure 3:
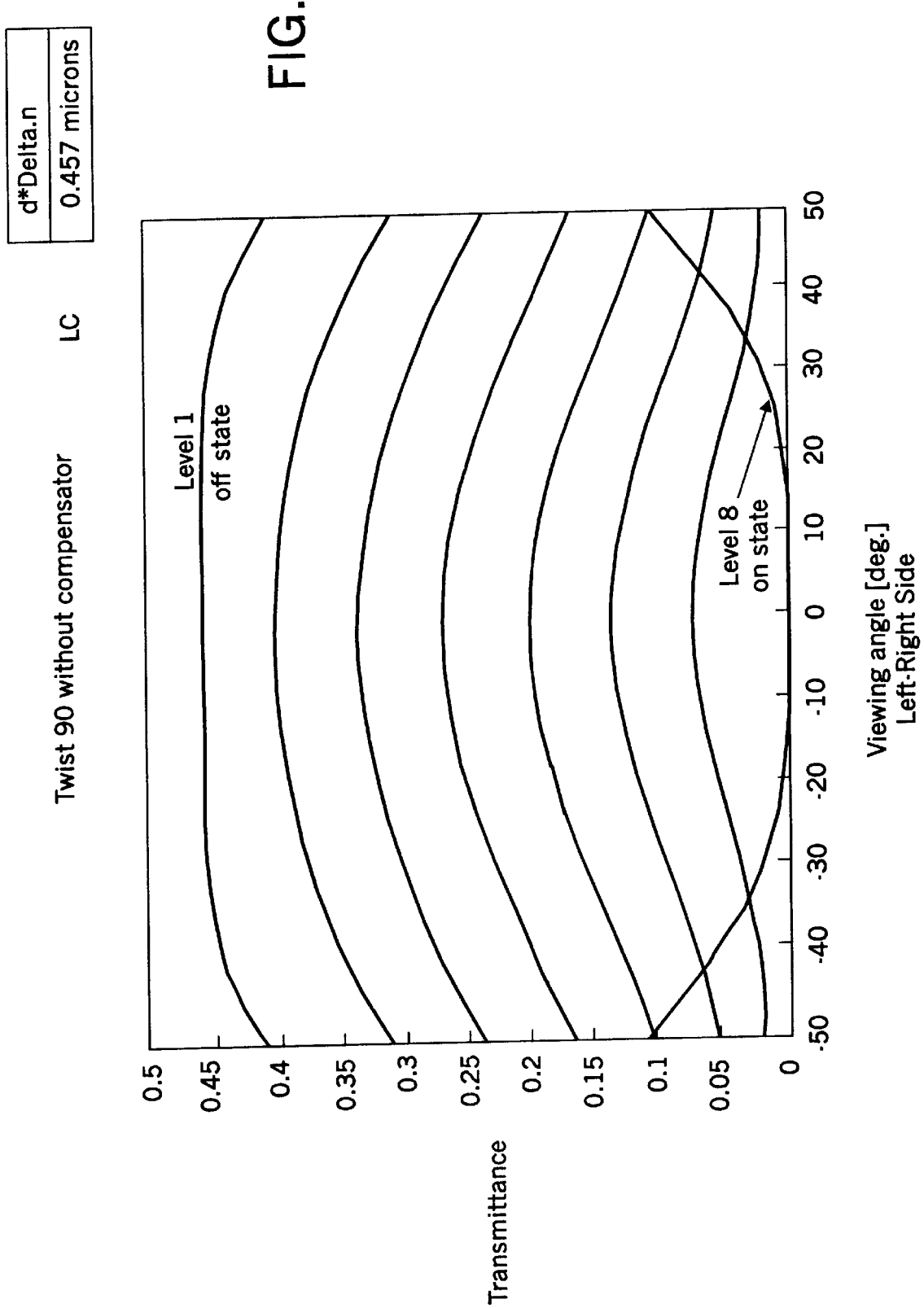
FIG. 3 is a graph that shows the 8-gray-level transmittances versus the horizontal viewing angle.
Figure 4:
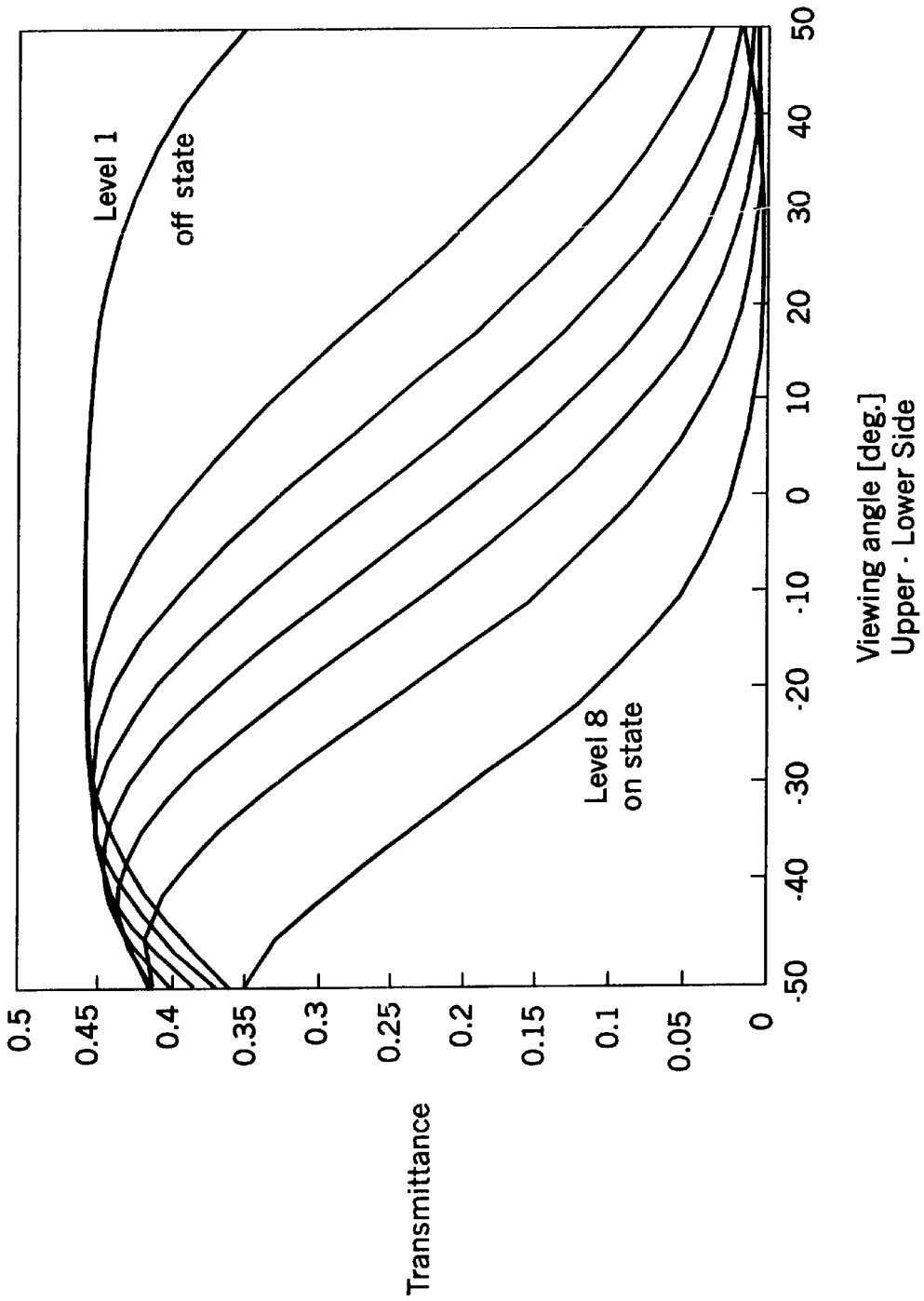
FIG. 4 is a graph that shows the 8-gray-level transmittances versus the vertical viewing angle.
Figure 5:
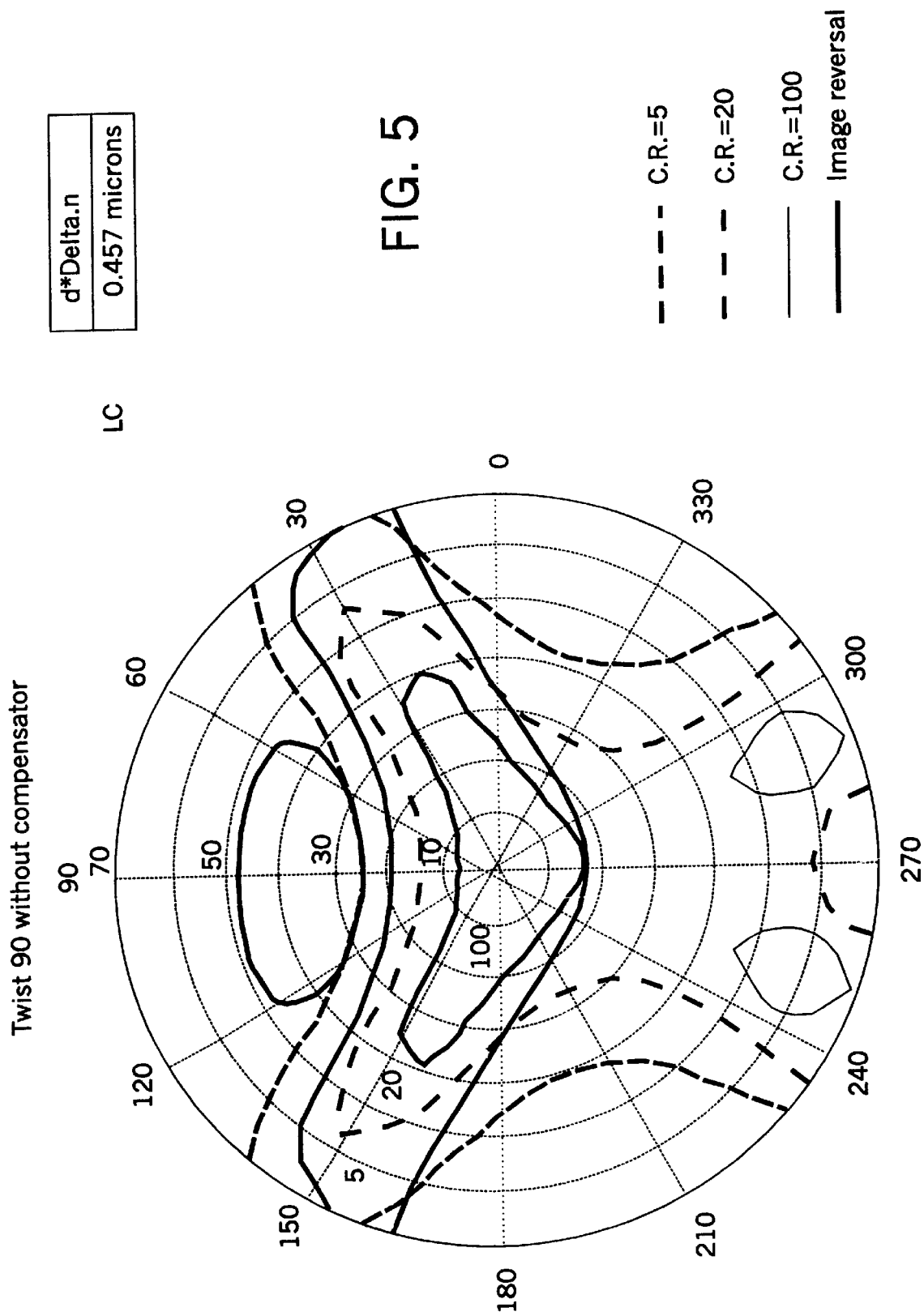
FIG. 5 is a graph that shows the iso-contrast curves with contrast ratios of 5, 20, 100, and the curves to indicate the beginning of image reversal. For the upper viewing zone, the image-reversal curves indicate the boundaries of image reversal occurring between the gray levels 1 and 2, or gray levels 2 and 3, or the gray levels 3 and 4. For the lower viewing zone, image-reversal curves indicate the boundaries of image reversal occurring between the gray levels 7 and 8.
Figure 6:
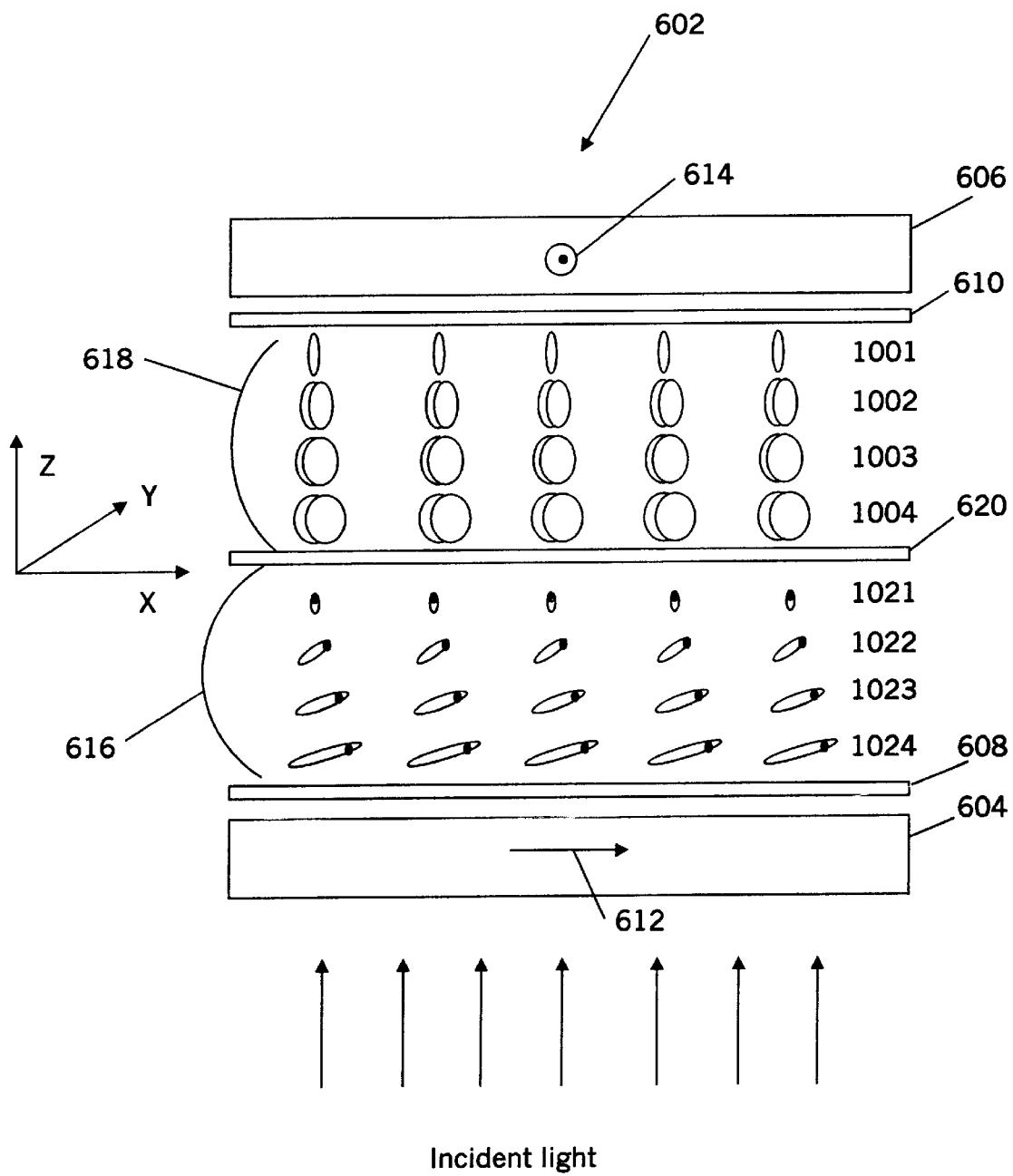
FIG. 6 is a schematic representation of a side view of one embodiment of a cell for an LCD in accordance with the present invention.

In FIG. 6, liquid crystal cell 602 has a polarizer 604 and an analyzer 606 opposite sides thereof. The transmitting axes 612 and 614 of the polarizer and analyzer are substantially along the x- and y-axis, respectively. (As shown in FIG. 6, the x axis lies horizontally in the plane of the drawing; the z axis lies vertically within the plane of the drawing and the y axis is perpendicular to the plane of the drawing.) The cell includes two glass substrates 608 and 620 which are walls of an enclosure of a liquid crystal display device made up of an array of liquid crystal display cells such as the one shown in FIG. 6. Within the enclosure are molecules or directors of a normal-twist rod-like nematic liquid crystal medium 616 of thickness $d_{lc}$ with positive birefringence addressing circuitry and cell defining structures formed on the interior surfaces of the substrates 608 and 620 to provide excitation to the cell and to define the cell's configuration.

Figure 7A:
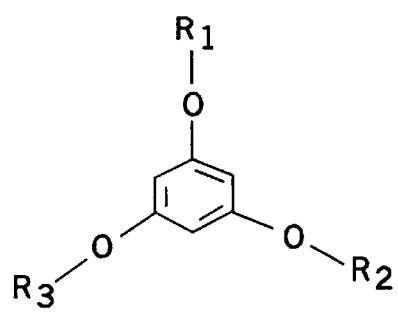
FIG. 7 illustrates some typical discotic-type LC or LC polymer in (a), (b), (c), (d) and the corresponding index of ellipsoid in (e).
Figure 7B:
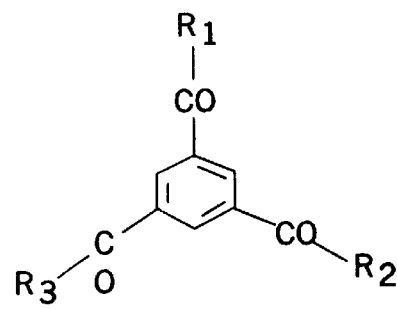
Figure 7C:
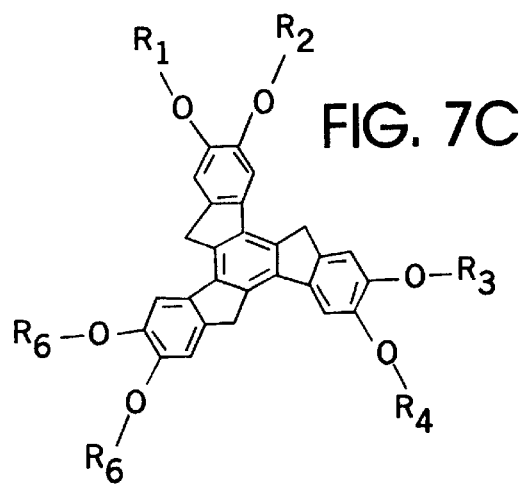
Figure 7D:
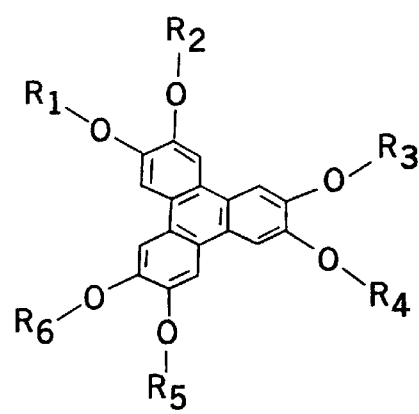
Figure 7E:
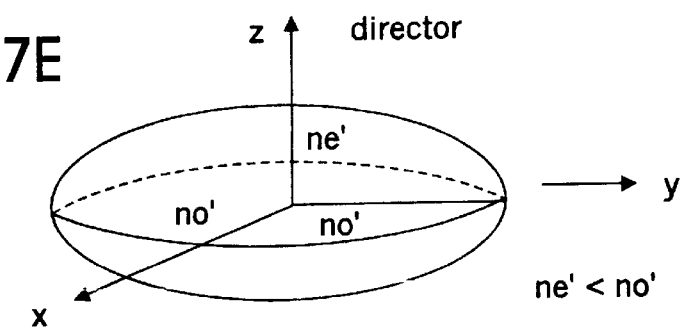

In accordance with the present invention, a compensation film 618 of thickness $d_f$ of a reverse twist discotic-type liquid crystal or a discotic-type liquid crystalling polymer is located between the analyzer 606 and the cell 602 separated by a glass shell 610 from the analyzer. The discotic-type liquid crystal and discotic-type liquid crystalline polymer are both characterized by a disc-like molecular structures that are illustrated in FIGS. 7(a) to 7(d), where the molecule lies flat on the x-y plane and occupy a disc-like space. $R_1$ to $R_6$ in FIGS. 7(a) to 7(d) are each a monofunctional or bifunctional substituent group. Due to the disc-like structure, the discotic material has an optical property such that the index of refraction parallel to the disc-plane is larger than that perpendicular to the disc-plane. FIG. 7(e) shows the index of ellipsoid of discotic structures represented by FIGS. 7(a) to 7(d). In FIG. 7(e), we have no'>ne', where no' and ne' are the indices of refraction of ordinary (optical E-field parallel to the disc-plane) and extra-ordinary (optical E-field perpendicular to the disc-plane) rays, respectively, in contrast to ne>no for the regular rod-like nematic liquid crystal molecules used in the TN cell.

In the quiescent state of the LC medium 616, adjacent to the bottom substrate, the directors of LC layer 1024 of the nematic medium 616 lie within ±10°, preferably within +5°, from the y-axis which is in the plane of the drawing and parallel to cell substrates. The directors of other LC layers from 1023 to 1021 twist in equal increments in right-handiness out of the plane of drawing to a magnitude of φ along the cell-thickness direction (the z-axis) at the top substrate 1021 the directors point within (90°−φ)±10°, preferably within (90°−φ)±5°, being perpendicular to the plane of drawing. The reverse-twist discotic-type compensation film is configurated in such a way that, the discotic-type LC or LCP has a total twist angle of but in opposite sense (i.e., left-handiness in this case) from the top to the bottom of the film 618. The directors of the molecules of the top layer 1001 lie within ±10°, preferably within ±5°, from the y-axis which is in the plane of the drawing and parallel to cell substrates. The directors of the remaining layers 1002 and 1004 twist in approximately equal increments in left-handiness out of the paper with a total magnitude φ until the directors of molecules in the bottom-most layer 1004 within (90°−φ)±10°, preferably within (90°−φ)±5°, being at right angles to the plane of drawing. In other words, the director 1004 of the discotic-type medium near the bottom of the film 618 is parallel or nearly parallel to the director adjacent to the top substrate 1021 of the nematic liquid crystal medium 616 and, at the same time, the director of the discotic-type material in the layer 1001 near the top of the film 618 is parallel or nearly parallel to the LC director 1024 adjacent to the bottom substrate of the nematic LC medium 616. The absolute value of Δn' $d_f$ is approximately equal to the absolute value of Δn $d_{lc}$ where Δn' (negative) is the birefringence of the compensation film 618 and Δn (positive) is the birefringence of the nematic liquid crystal medium 616.

The discotic-type film 618 is represented herein as consisting of four layers, 1001, 1002, 1003, and 1004 of equal thickness with the directors of layers 1001 to 1004 twisting progressively by a constant angle between successive layers. The TN medium 616 is also represented as consisting of four segments, 1001, 1002, 1003, and 1004 of equal thickness directors of the segments twisting progressively from 1021 to 1024 by a constant angle between successive sections. Though represented by four layers, it should be understood that many more layers can exist in both the film 618 and the medium 616.

Figure 8:
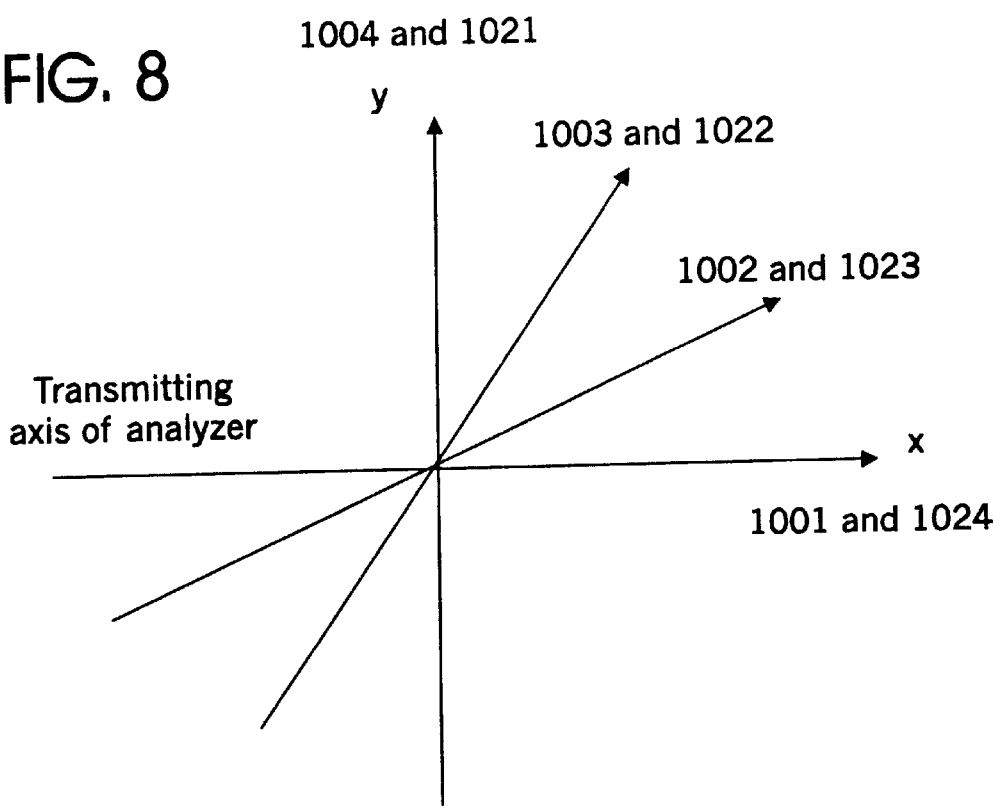
FIG. 8 illustrates the directors as viewed from the top of FIG. 6.
Figure 9:
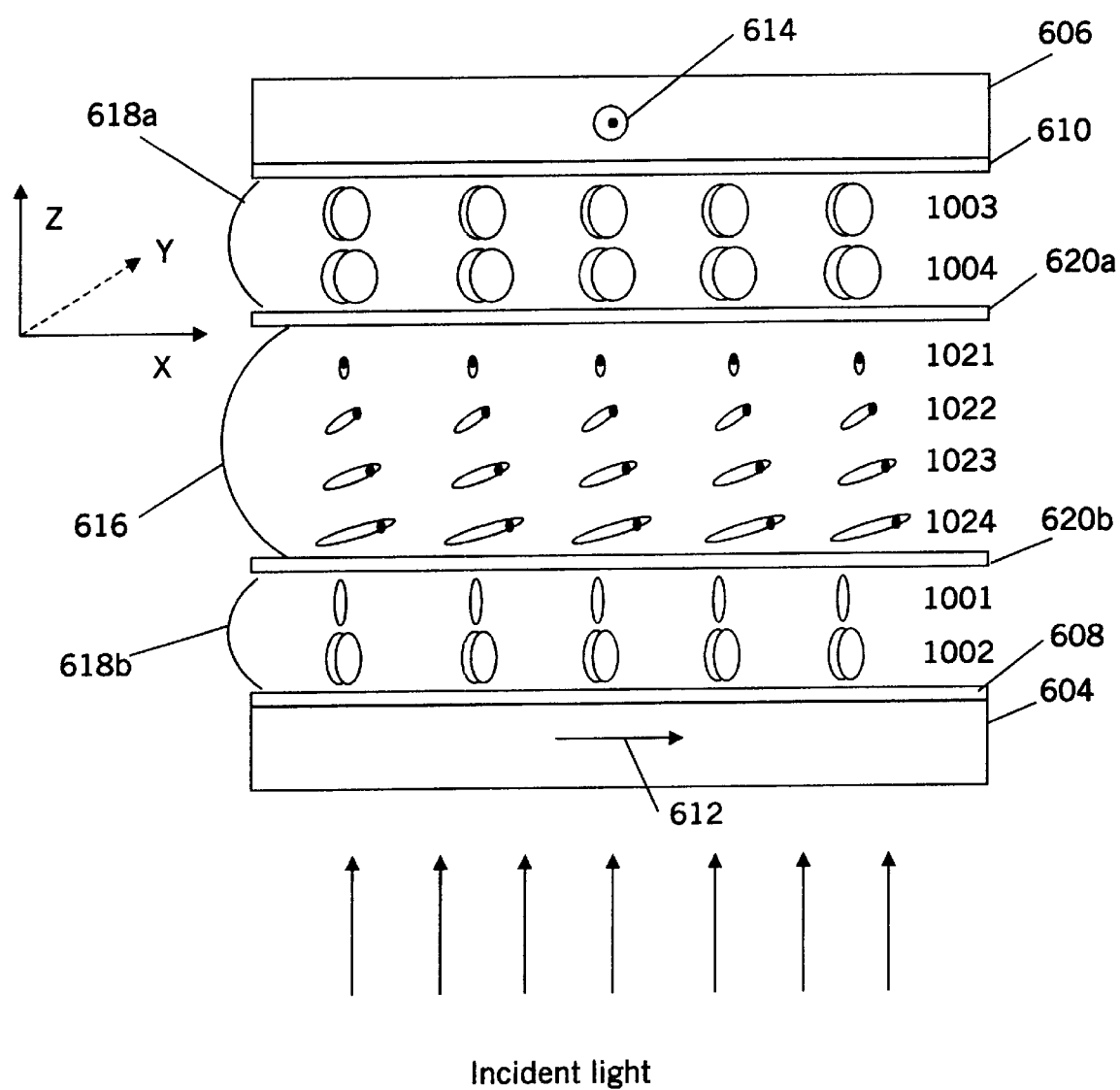
FIG. 9 is a schematic side view representation of an alternative arrangement of an LCD cell in accordance with the present invention.

As shown in FIG. 8, the directors of films 1001, 1002, 1003, and 1004 within the discotic-type film 618 are set parallel to the directors of sections 1024, 1023, 1022, and 1021 of the medium 616, respectively. The directors twists in right-handiness from 1001 to 1004 within the discotic-type film 618, but twists in left-handiness from 1021 to 1024 within the medium 616. As shown in FIG. 12, with this arrangement the electro-optical effect of each substrate of the medium 616 is compensated by a corresponding layer within the discotic-type twist compensation film 618. The mechanism of compensation remains effective as long as the relationship between the directors of the medium and the film remains as shown in FIG. 8. In other words, the relative location of the film and the medium can change from that shown in FIG. 6. For instance, the twist discotic-type compensation film can be positioned between the polarizer 608 and the TN medium 616 instead of between the analyzer 610 and the TN medium 616 as shown as FIG. 6. Also, the twist discotic-type compensation film 618 can be divided into two parts to sandwich the TN medium 616, such as shown in FIG. 9, where the twist discotic-type compensation film 618 is divided into 618a and 618b separated from the medium 616 by glass layers 620a and 620b to sandwich the TN medium. The top view of the directors for the arrangement of FIG. 9 is the same as that for FIG. 6. In both cases, the arrangement of directors is represented by FIG. 8.

Figure 10:
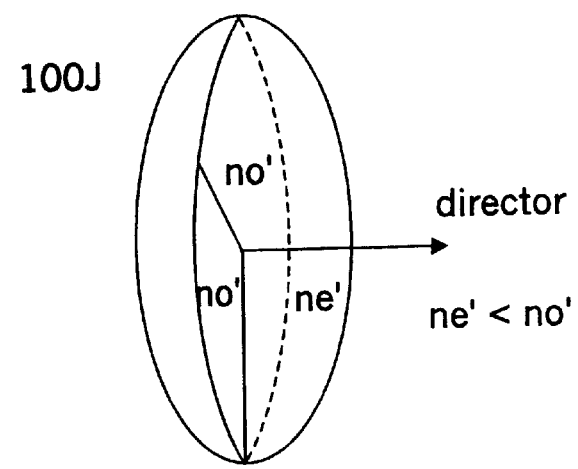
FIG. 10 is schematic representations of the indices of ellipsoid of a slice of the twist discotic-type compensation film and its corresponding slice of the field-off TN medium.
Figure 10:
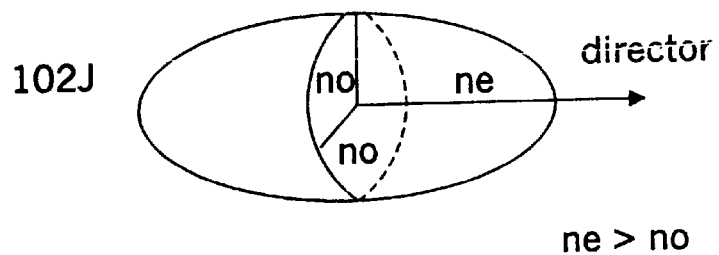

The mechanism of compensation involved dividing both the reverse-twist discotic-type compensation film 618 and the normal-twist LC medium 616 into n layers (n is an integer larger than 2), the indices of ellipsoid of any jth layer (j from 1 to n) counting from the bottom of the compensation film 618 and the corresponding jth layer (j from 1 to n) counting from the top of the LC medium 616 can be represented by 100J and 102J, respectively, as shown FIG. 10. The 100J has a negative birefringence with its director parallel to that of 102J with positive birefringence. The cancellation of birefringent effect due to 102J by the birefringent effect of 100J not only occurs near normal incidence but also for oblique incidences.

EXAMPLE 1

Figure 11A:
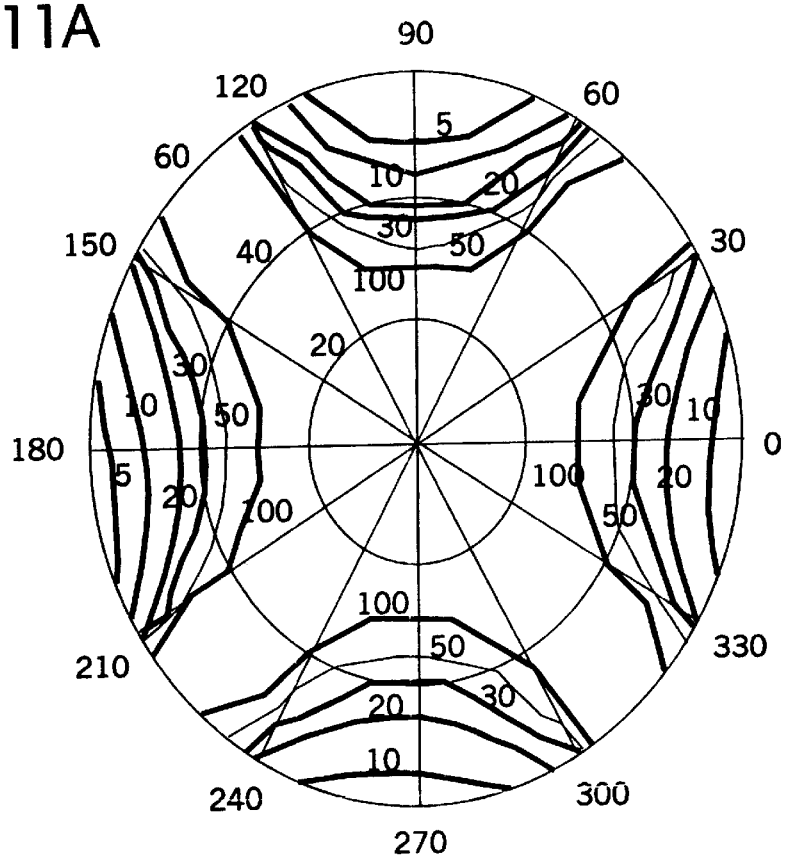
FIG. 11(a) is a graph that shows the measured curves of iso-contrast ratio using white-light incident upon the example 1 of present invention.
Figure 11B:
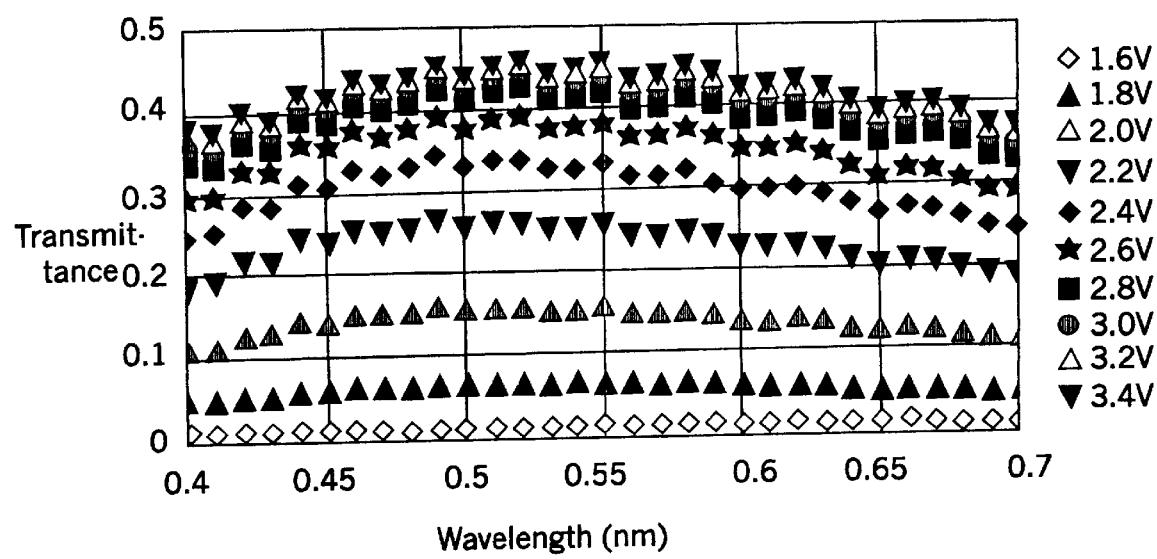
FIG. 11(b) is a graph that shows the measured transmission as a function of wavelength of the light incident upon example 1 of present invention using the applied voltage as a parameter.

A twist angle of 90°, right-hand-twist, single-domain TN using a nematic LC mixture, TC5065 from Chisso Corporation, Japan, with a cell gap of about 5 μm is compensated by a 90°-left-hand-twist discotic-type compensation film with a retardation ($\Delta n'd_f$) of about −0.475 μm measured at a wavelength of 550 nm. The relative positions and the orientations of the single-domain TN and the discotic-type compensation film as well as the crossed polarizers are arranged as shown in FIG. 6. The iso-contrast curves of this invention were measured as a function of viewing angle using a white light source as incident light on the display. The results obtained are shown in FIG. 11(a) where the maximum polar angle is 60° and the iso-contrast-ratio curves of 100, 50, 30, 20, 10, and 5 are indicated. It indicates that the display has a contrast ratio larger than 100 to 1 within a viewing cone of ±30° from normal incidence. We also measured the transmission as a function of wavelength using the applied voltage as a parameter. The results are shown in FIG. 11(b) where a flat spectral response from 400 to 700 nm under applied voltage levels from 0 to 3.4 V indicates that the display has a negligible color-shift versus applied voltages.

COUNTER EXAMPLE 1(a)

Figure 12A:
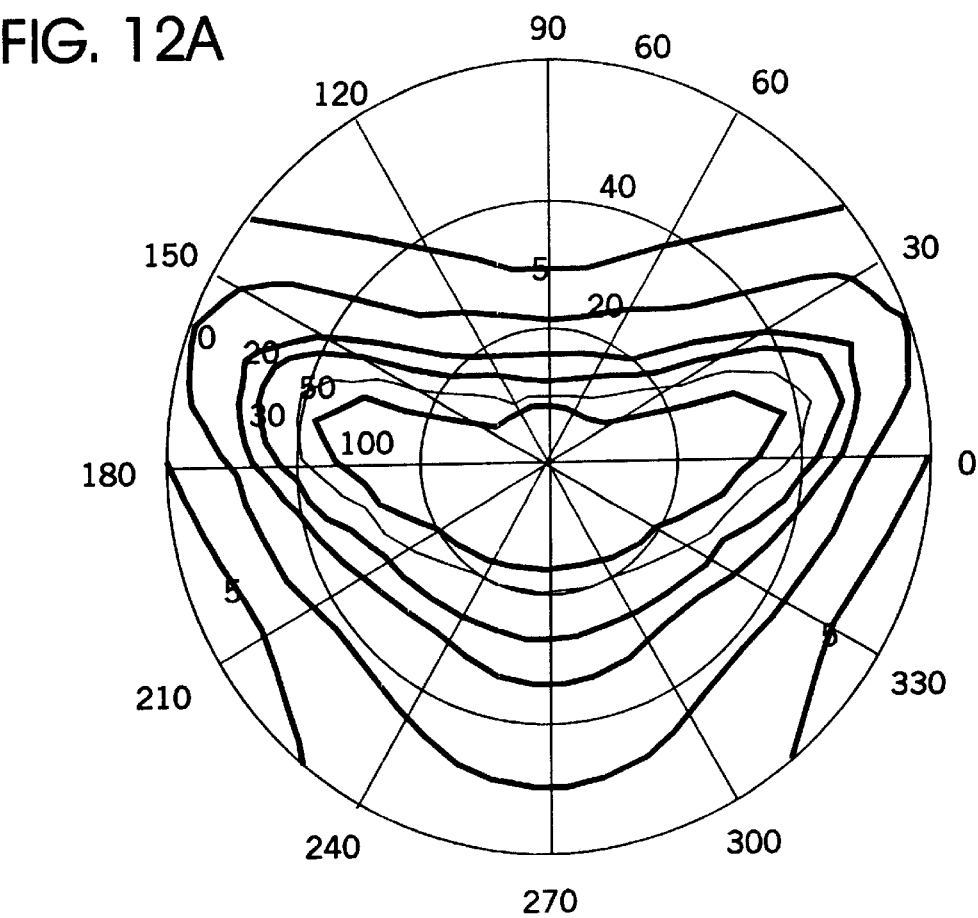
FIG. 12(a) is a graph that shows the measured curves of iso-contrast ratio using white-light incident upon the counter example 1(a).
Figure 12B:
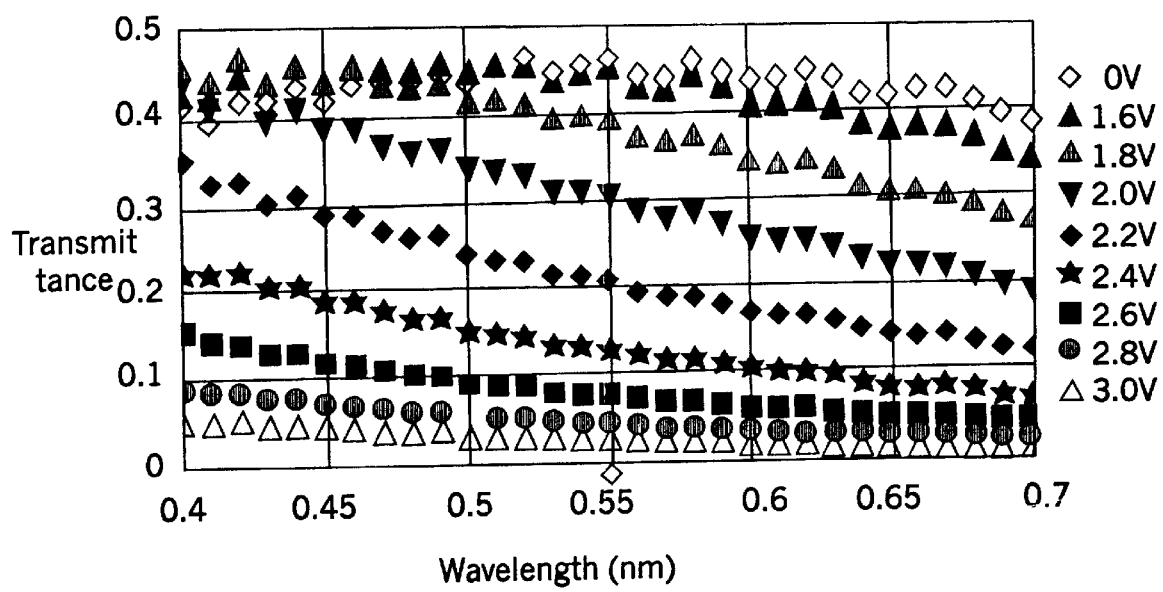
FIG. 12(b) is a graph that shows the measured transmission as a function of wavelength of the light incident upon the counter example 1(a) using the applied voltage as a parameter.

The twist discotic-type compensation film was removed from the example 1 and the single-domain TN without the twist discotic-type compensation film was placed between crossed polarizers to form the regular normally-white 90°-TN. Then, the iso-contrast ratio curves as a function of viewing angle were measured. The results obtained are shown in FIG. 12(a) where the maximum polar angle is 60° and the iso-contrast-ratio curves of 100, 50, 30, 20, 10, and 5 are indicated. The boat-shaped, central region in FIG. 12(a), representing a contrast ratio larger than 100 to 1, is much smaller than that shown in FIG. 12(a). The transmission as a function of wavelength using the applied voltage as a parameter was also measured. The results are shown in FIG. 12(b). Comparing FIGS. 11 with 12, it can be seen that the counter example provides a much inferior viewing angle and a severe color-shift as a function of applied voltage.

COUNTER EXAMPLE 1(b)

Figure 13A:
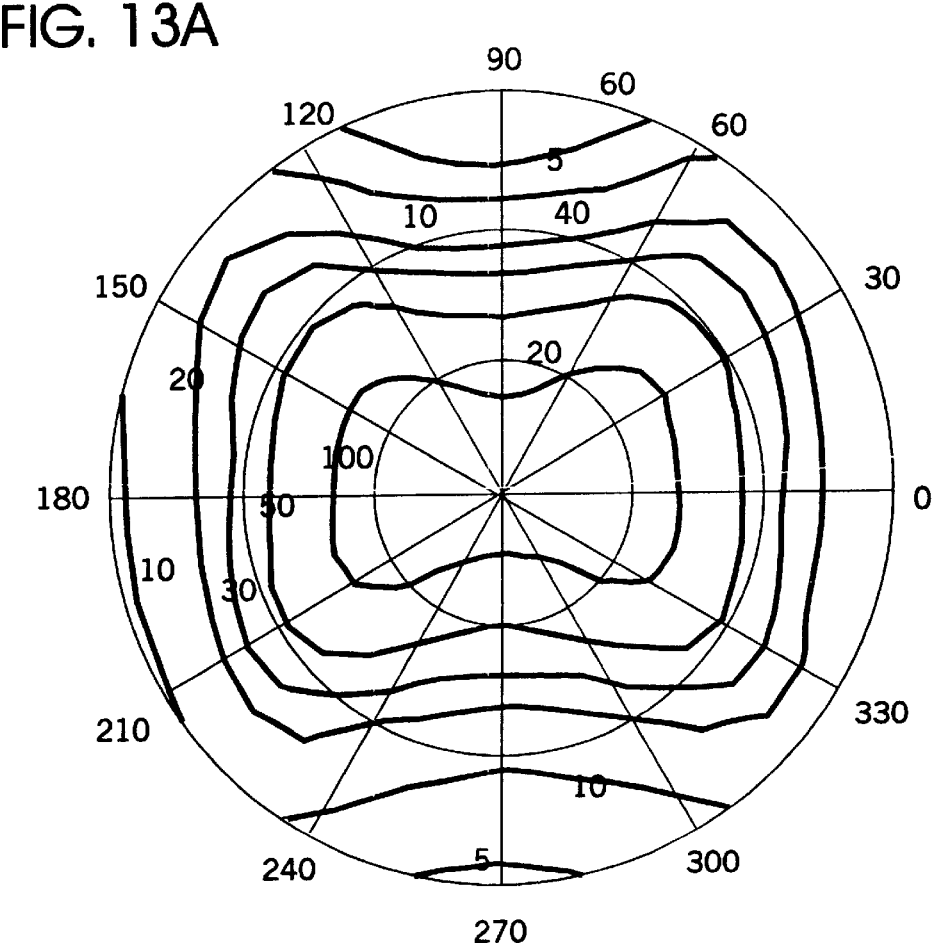
FIG. 13(a) is a graph that shows the measured curves of iso-contrast ratio using white-light incident upon the counter example 1(b).
Figure 13B:
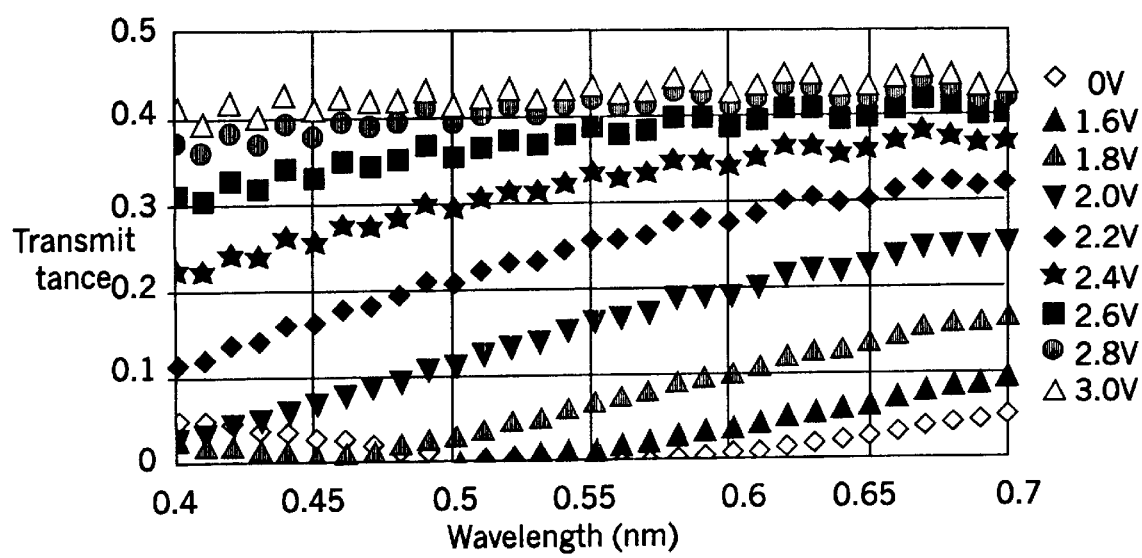
FIG. 13(b) is a graph that shows the measured transmission as a function of wavelength of the light incident upon the counter example 1(b) using the applied voltage as a parameter.

This example is the same as counter example 1(a) except that the crossed polarizers were changed into parallel polarizers to form a regular normally-black 90°-TN display. Then the iso-contrast ratio curves were measured as a function of viewing angle. The results obtained are shown in FIG. 13(a) where the maximum polar angle is 60° and the iso-contrast-ratio curves of 100, 50, 30, 20, 10, and 5 are indicated. The central region in FIG. 13(a), representing a contrast ratio larger than 100 to 1, is much smaller than that shown in FIG. 11(a). The transmission as a function of wavelength using the applied voltage as a parameter was also measured. The results obtained are shown in FIG. 13(b). Comparing FIGS. 11 with 13, it can be seen that, for this counter example, a much inferior viewing angle and a severe color-shift as a function of applied voltage was obtained.

EXAMPLE 2

Figure 20:
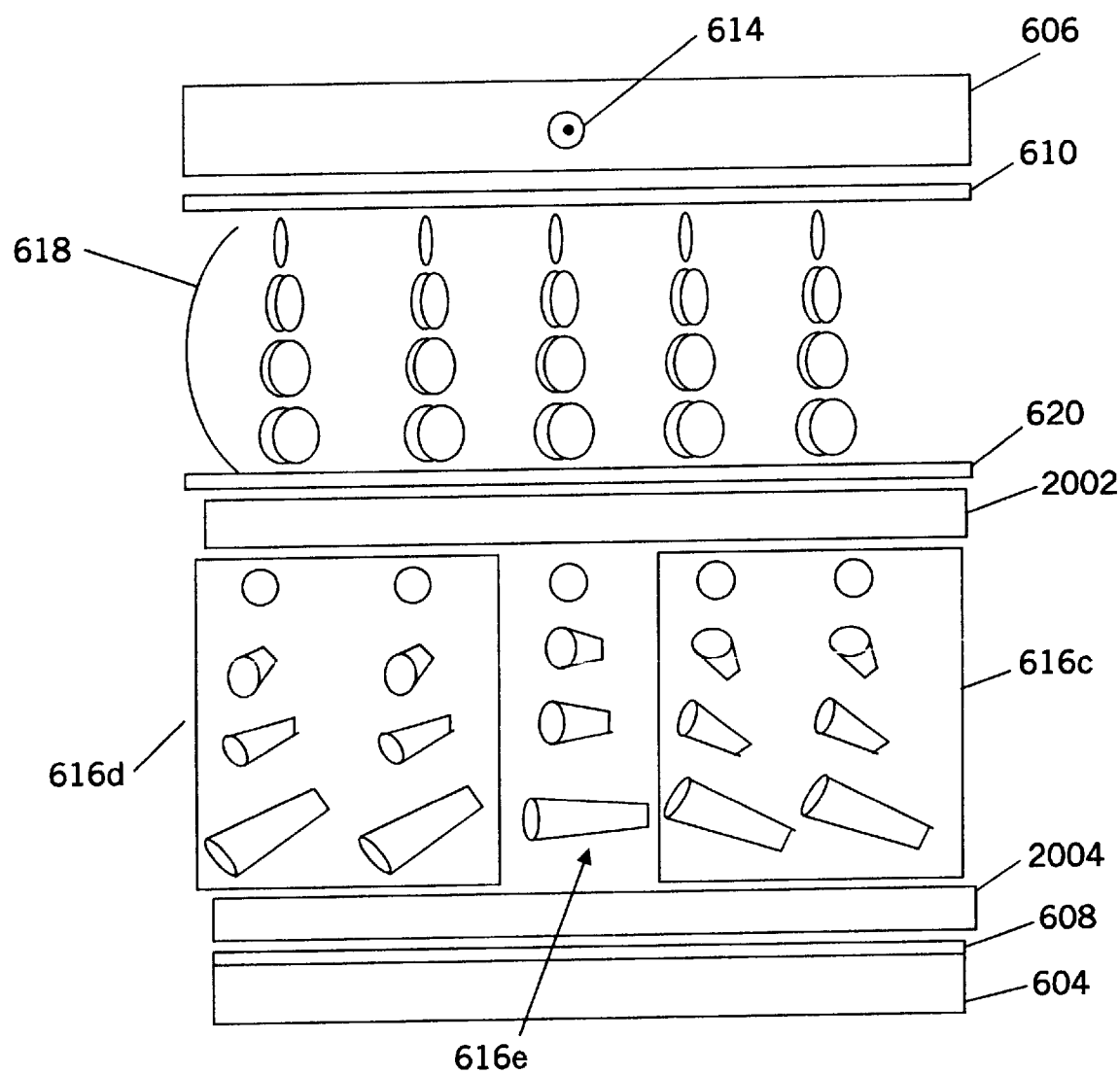
FIG. 20 shows a schematic side view representation of the liquid crystal of example 2.

This example is the same as example 1 except that the single domain TN cell is replaced by a two-domain TN cell. The side-view of the present implementation is shown in FIG. 20. The two-domain TN cell consists of a single domain 616c separated from another single domain 616d.

Both single domains 616c and 616d have the same twist sense but different in pretilt angles. Between single domains 616c and 616d, there exists a disclination line 616e. However, at the quiescent state, there is no light leakage at the location of the disclination line because of the existence of the twist discotic-type compensation film 118 so that we have a good dark state resulting in high contrast using the present invention. As a comparison, the conventional uncompensated two-domain TN display is placed between parallel polarizers to be operated in a normally-white condition. There is light leakage in the dark state at the location of disclination line between single domains 616c and 616d resulting in poor contrast. The light leakage can be blocked by a black matrix fabricated at the locations of disclination lines. However, in doing so, the aperture ratio of the display is reduced due to the addition of the black matrix.

Figure 14A:
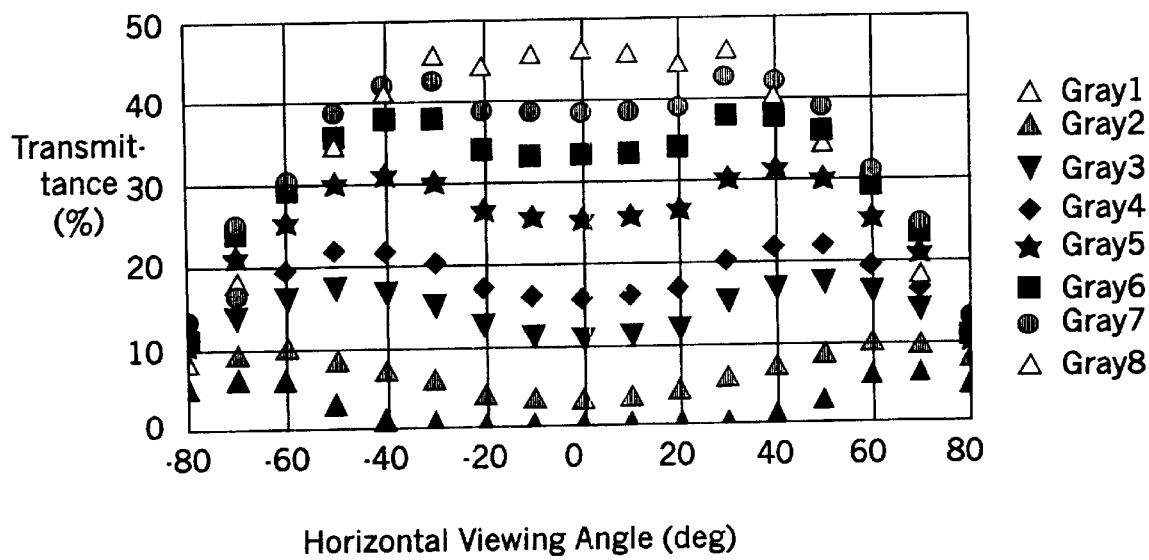
FIG. 14(a) is a graph that shows the measured transmission as a function of horizontal viewing angle for gray levels 1 to 8 for the example 2 of present invention.
Figure 14B:
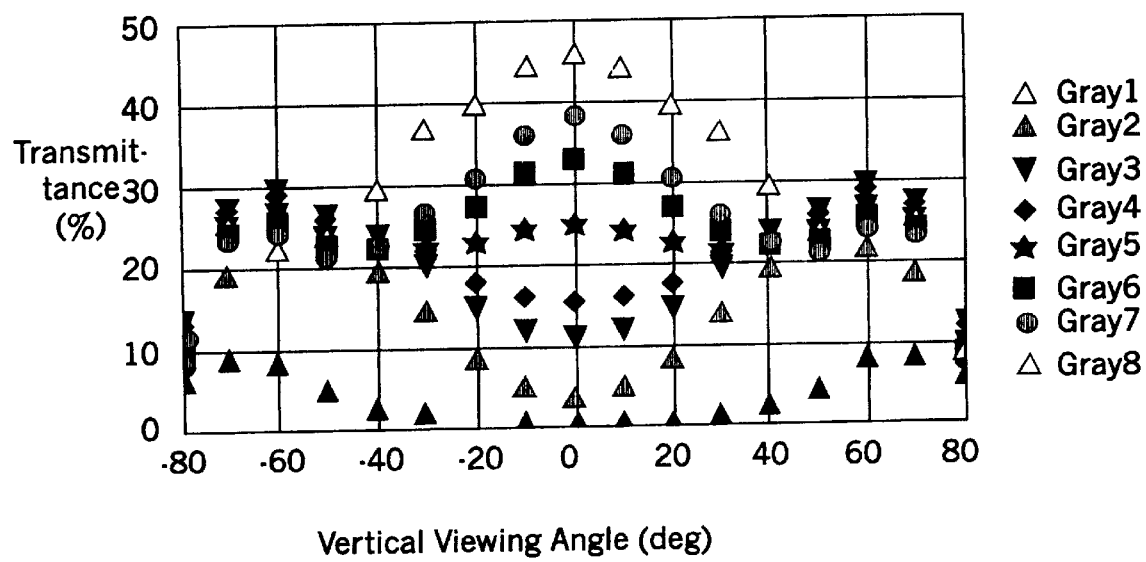
FIG. 14(b) is a graph that shows the measured transmission as a function of vertical viewing angle for gray levels 1 to 8 for the example 2 of present invention.

In general, a typical two-domain TN cell consists of periodic display pixel or unit within which there are two distinct TN orientations each occupying approximately half of the pixel area. There are several ways to fabricate two-domain TN display such as published by Yang ("Two-Domain Twisted Nematic and Tilted Homeotropic Liquid Crystal Displays for Active Matrix Applications," Conference Record of 1991 International Display Research Conference, San Diego, Calif., pp. 68–72), by Koike et al. ("A Full Color TFT-LCD with a Domain-Divided Twisted Nematic Structure," SID'92 Digest, pp. 798–801), and by Suzuki et al., "33-cm-Diagonal Full-Color Wide-Viewing-Angle C-TN LCDs for Use in a Workstation," SID'94 Digest, pp. 267–270). The transmission of gray levels 1 to 8 was measured as a function of horizontal viewing angle (from 60° in the 9 o'clock direction to 60° in the 3 o'clock direction) and vertical viewing angle (from 60° in the 6 o'clock direction to 60° in the 12 o'clock direction). The results obtained are shown in FIGS. 14(a) and 14(b), respectively, to indicate that our twist disotic-type compensation film can be used to compensate a two-domain TN to achieve wide-viewing angles in both the horizontal and vertical viewing directions.

EXAMPLE 3

Figure 15A:
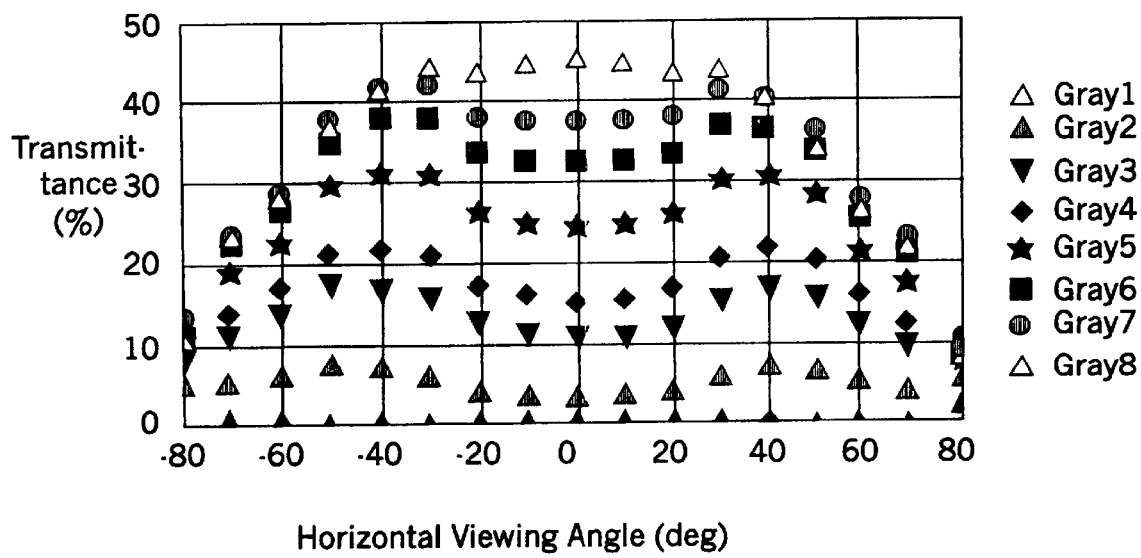
FIG. 15(a) is a graph that shows the measured transmission as a function of horizontal viewing angle for gray levels 1 to 8 for the example 3 of present invention.
Figure 15B:
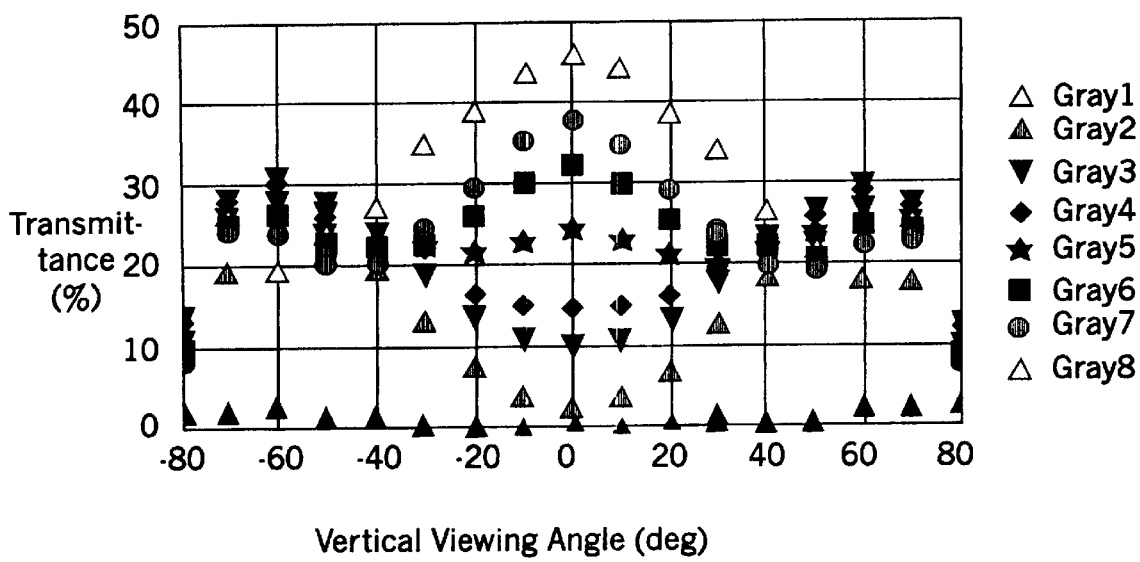
FIG. 15(b) is a graph that shows the measured transmission as a function of vertical viewing angle for gray levels 1 to 8 for the example 3 of present invention.

This example is the same as example 2 except that two extra-compensation films called a- and c-plates 2002 and 2004 are inserted either between the analyzer and the twisted discotic-type compensation film or between the polarizer and the two-domain TN cell. The a-plate 2002 was placed closest to the analyzer for the former and closest to the polarizer for the latter. The a-plate is a uniaxial birefringent plate of positive birefringence having its optical axis parallel to both the film plane and the adjacent transmitting axis of either the polarizer or analyzer. In this example, an a-plate with a retardation of about 100 nm was used. The c-plate is a uniaxial birefringent plate of either positive or negative birefringence having its optical axis parallel to the normal of the film. In this example, a c-plate with a retardation of about 140 nm in film-thickness direction was used. The transmission of gray levels 1 to 8 were measured as a function of horizontal viewing angle (from 60° in the 9 o'clock direction to 60° in the 3 o'clock direction) and vertical viewing angle (from 60° in the 6 o'clock direction to 60° in the 12 o'clock direction). The results obtained are shown in FIGS. 15(a) and 15(b), respectively, to indicate that our twist disotic-type compensation film can be used to compensate two-domain TN with added a- and c-plates to achieve wide-viewing angles in both the horizontal and vertical viewing directions. Comparing FIG. 14 with FIG. 15, we can see that the dark state of the display (gray level 1) has been improved (or became darker) by the addition of the a-plate and c-plate. Further more, a biaxial compensation film with $(n_x-n_y)d_b=$ 100 nm and $(n_x-n_z)d_b=140$ nm (where $n_x$, $n_y$, and $n_z$ (z is along the film normal) are the indices of refraction of the biaxial compensation film, and $d_b$ is the thickness of the biaxial compensation film.) can be used to replace the combination of the a- and c-plates with similar results in wide viewing angles. The effect of $(n_x-n_y)d_b=100$ nm is equivalent to that of the a-plate and the effect of $(n_x-n_z)d_b=$ 140 nm is equivalent to that of the c-plate.

EXAMPLE 4

Figure 16A:
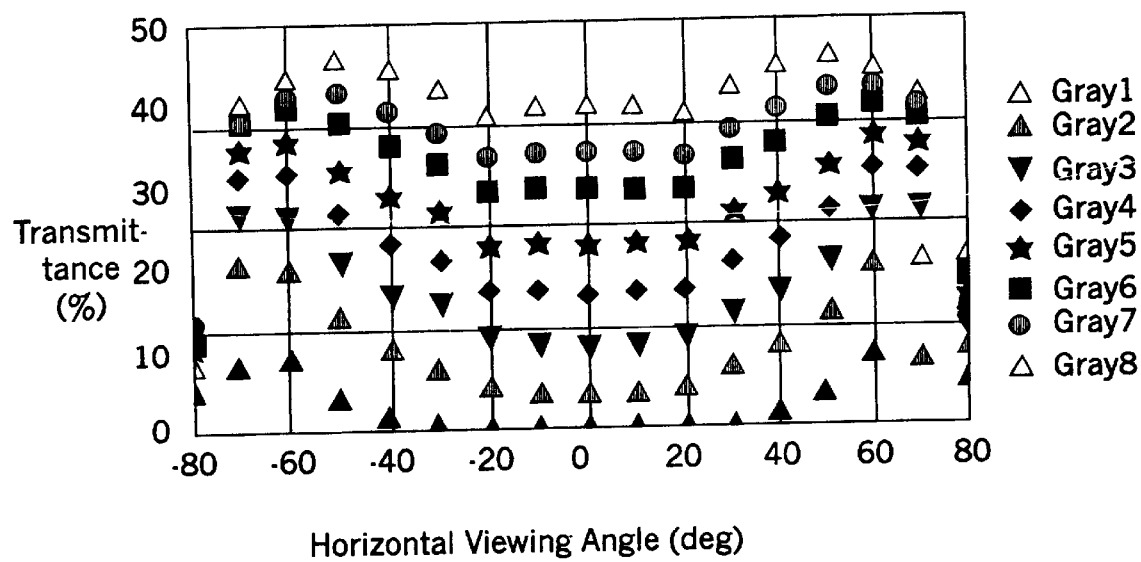
FIG. 16(a) is a graph that shows the measured transmission as a function of horizontal viewing angle for gray levels 1 to 8 for the example 4 of present invention.
Figure 16B:
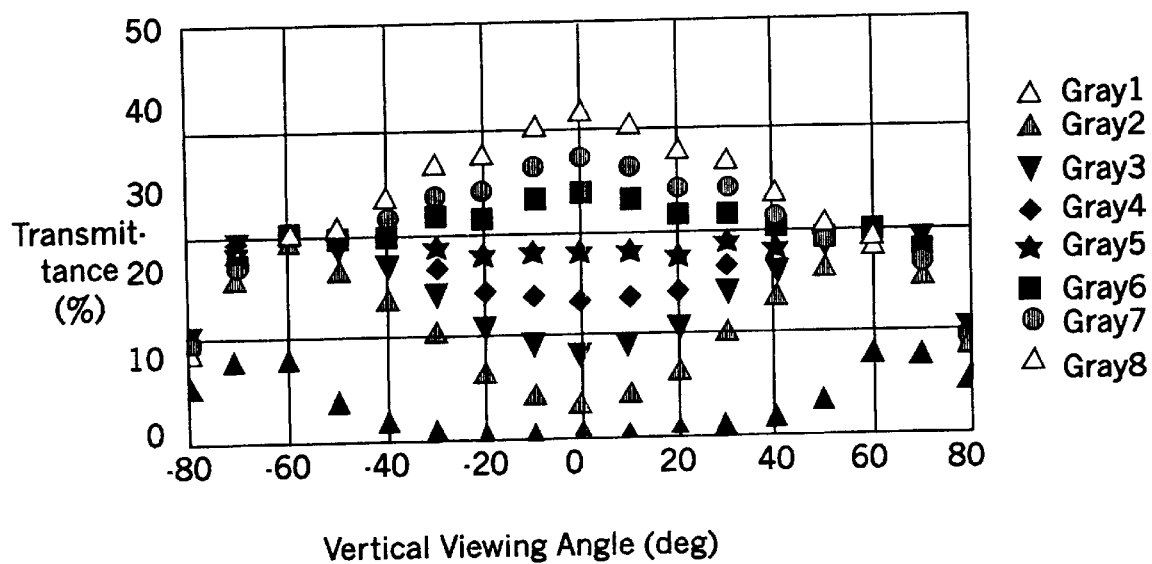
FIG. 16(b) is a graph that shows the measured transmission as a function of vertical viewing angle for gray levels 1 to 8 for the example 4 of present invention.

This example is the same as Example 2 except that the cell gap of the two-domain TN cell is changed from 5 to 3 μm and the retardation value of the twist discotic-type compensation film is changed from 0.475 μm to about 0.285 μm. The transmission of gray levels 1 to 8 was measured as a function of horizontal viewing angle (from 60° in the 9 o'clock direction to 60° in the 3 o'clock direction) and vertical viewing angle (from 60° in the 6 o'clock direction to 60° in the 12 o'clock direction). The results obtained are shown in FIGS. 16(a) and 16(b), respectively. The results indicate that the retardation value of our twist disotic-type compensation film can be reduced substantially to match the reduction in the cell gap of two-domain TN cell and still maintain wide-viewing angles in both the horizontal and vertical viewing directions. The reduction of the TN cell gap is one of the most effective ways to improve the response times of the display. In this case, a reduction of the TN cell gap from 5 to 3 μm can reduce the response times of the display by a factor about 2.8. LCDs of fast response times are very attractive for displaying video images.

EXAMPLE 5

Figure 17:
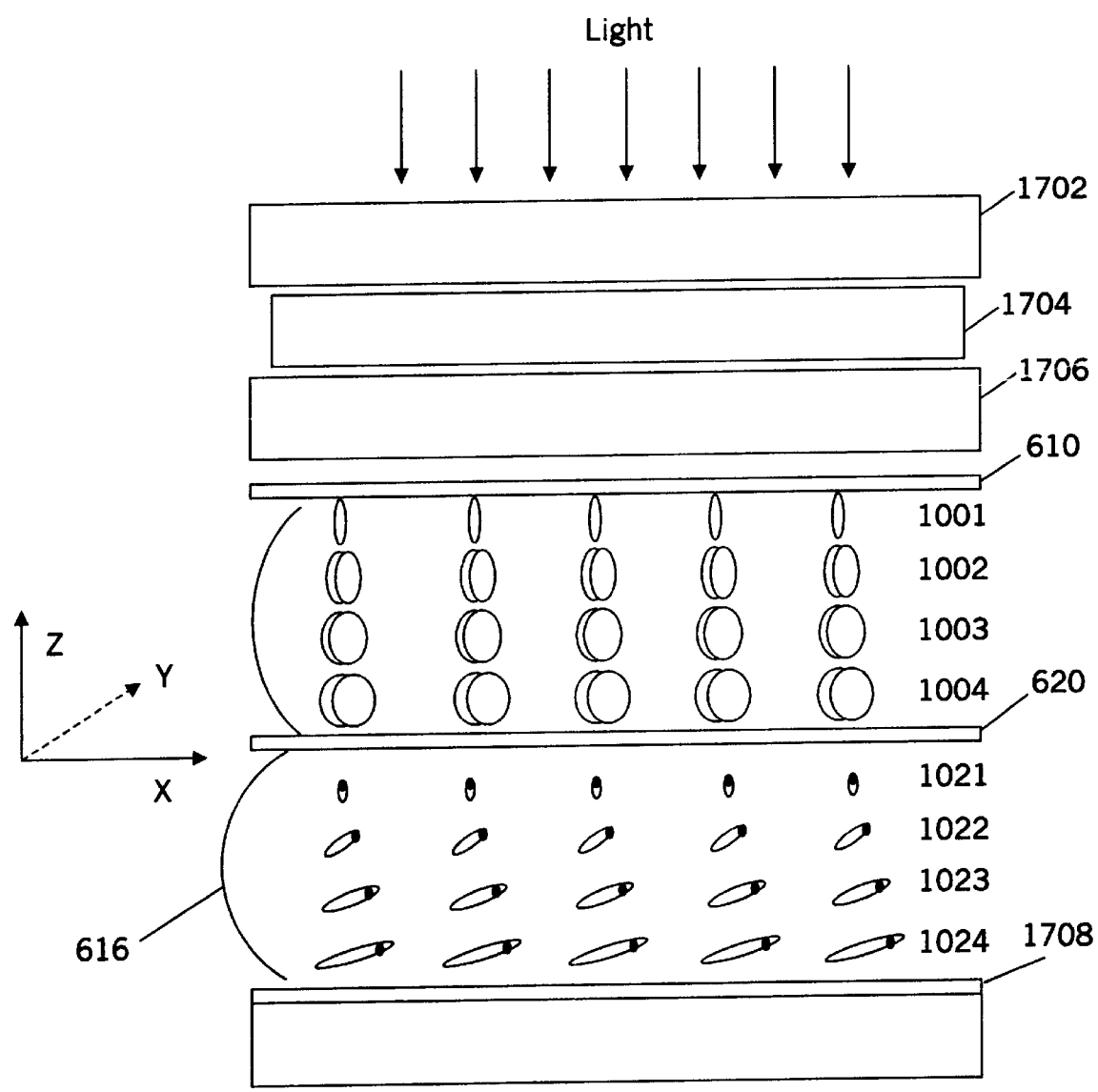
FIG. 17 is a schematic side view of a direct-view reflective flat panel display in accordance with the present invention.
Figure 18:
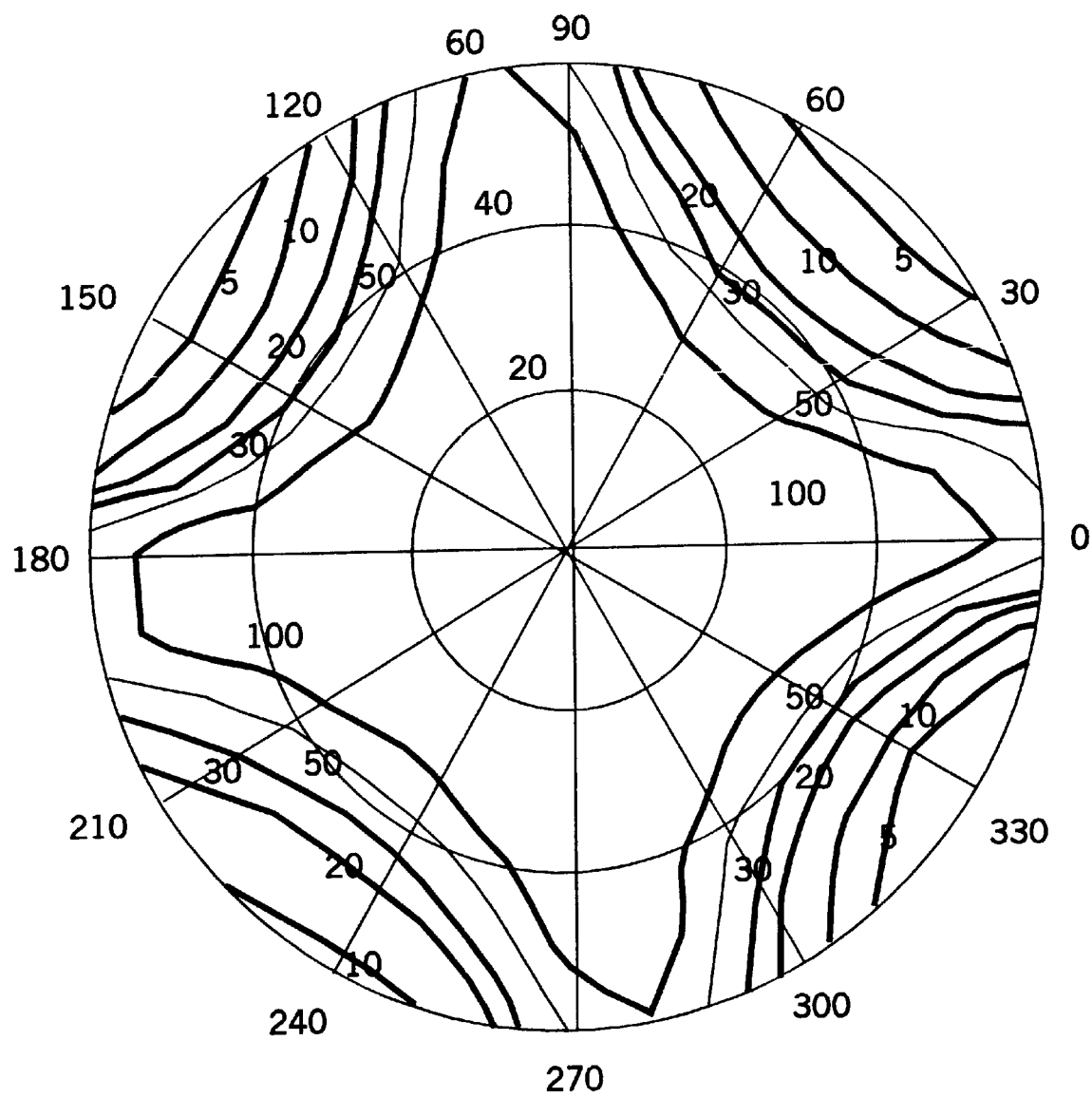
FIG. 18 shows the measured curves of iso-contrast ratio using white-light incident upon the direct-view reflective display whose schematic is shown in FIG. 17.
Figure 19:
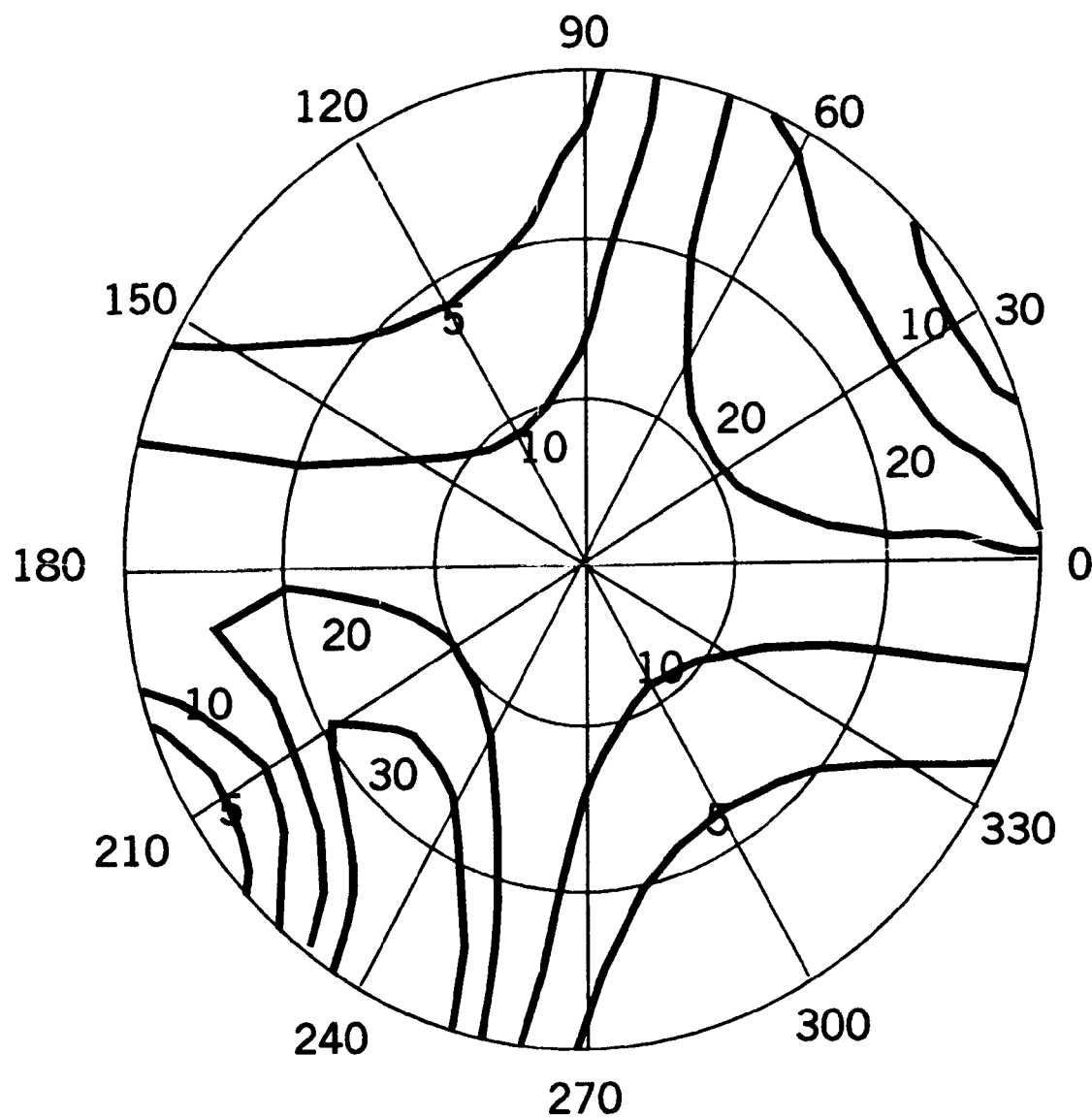
FIG. 19 shows the measured curves of iso-contrast ratio using white-light incident upon the direct-view reflective display whose schematic is the same shown in FIG. 17 except that the twist discotic-type compensation is removed.

The present invention can be applied, not only to the transmissive-type LCDs but also reflective-type LCDs, including reflective direct-view flat panel displays and reflective projection light valves. The basic scheme of present invention for reflective direct-view LCDs is shown in FIG. 17 which is a modification of FIG. 6. The analyzer 606 in FIG. 6 is replaced by a polarizer 1702, a front scattering film 1704, and a quarter-wave plate 1706, and the polarizer 604 in FIG. 6 is replaced by a reflective electrode 1708. (In projection light valves, the polarizer 1702 and the front scattering film 1704 are replaced by a polarizing beam splitter.) The twist discotic-type LC or LCP film 618 and the TN cell 616 are same for both FIGS. 6 and 17. In FIG. 17, the incident light impinges on the top of the display. The quarter-wave plate 1706 is optional and can be removed when the TN cell has a twist angle between 52 and 54°. In this example 5, we used LC mixture TL222 from EM Merck with a cell gap of about 2 μm and a left-handed twist angle of 45° for the TN cell 102. A twist discotic-type LC or LCP film with a right-handed twist angle of 45° and a total retardation of about 428 nm was utilized. The iso-contrast ratio curves of this invention as a function of viewing angle using a white light source as incident light on the display were measured. The results are shown in FIG. 18 where the maximum polar angle is 60° and the iso-contrast-ratio curves of 100, 50, 30, 20, 10, and 5 are indicated. It indicates that the display has a contrast ratio larger than 100 to 1 within a viewing cone of ±30° from normal incidence. As a comparison, we removed the twist discotic-type compensation film 100 from FIG. 17, the measured iso-contrast ratio curves are shown in FIG. 19, where the contrast ratio does not exceed 20 to 1 within a viewing cone of ±20° from normal incidence.

In the discussed examples 1 to 5, an external voltage is used to drive the twist nematic medium and no voltage is applied to the twist discotic-type compensation film. However, if the directors of the twist discotic-type film have a positive dielectric anisotropy and can be deformed by an external field, the results remain the same in each example if the twist discotic-type film is driven by an external voltage and no voltage is applied to the twist nematic medium. The latter case usually implies much larger driving voltages than the former.

Five major advantages of wide-viewing-angle displays of the present invention are:

use a single compensation film to compensate the unactivated quiescent, field-off state instead of two compensation films to compensate the activated or field-on state.

the single-layer compensation film can be used to compensate both the single-domain or two-domian (or divided domain) TNs to further enlarge the viewing angle. Prior art using two unstructured compensation films can only be effective to compensate the single domain TN, unsuitable to compensate the two-domain (or divided-domain) TN.

the use of the single-layer twist discotic-type compensation film on a two-domain TN cell will make the disclination line between two domains within a pixel of the two-domain TN cell invisible in the dark state of the display. The contrast ratio is much improved as compared to a two-domian TN cell without compensation where the disclination lines cause a light leakage in the dark state of the display. The light leakage can be blocked by a black matrix fabricated at the locations of disclination lines. However, in doing so, the aperture ratio of the display is reduced due to the addition of the black matrix.

the use of the single-layer twist discotic-type compensation film on either the single-domain or two-domain TN cell allows us to reduce the cell gap of either the single-domain or two-domain TN substantially below the so-called first Gooch-Tarry minimum (defined as $d=0.866$ $\Delta n\lambda$ for transmissive-type displays, where $\Delta n$ is the birefringence of the LC medium; $\lambda$ is the wavelength of the incident light; and d is the cell gap at the first Gooch-Tarry minimum) and still maintain high contrast ratio and wide-viewing angles. The TNs with shortened cell gaps have faster response times superior for displaying video images.

the use of the single-layer twist discotic-type compensation film on either the single-domain or two-domain TN cell can achieve much less color-shift as a function of applied voltage especially for viewing the display from near normal incidence.

Above we have described a number of embodiments of our invention. It should be apparent from these embodiments that a number of modifications can be made to the structure of the embodiments without departing from the spirit and scope of the invention. Therefore, it should be understood that the invention is not limited to the disclosed embodiments, but should be interpreted in view of the spirit and scope of the attached claims.

What we claim is:

1. A display device for viewing at various angles with respect to a normal axis, the display device comprising:
   a multilayer liquid crystal cell medium between two substrates, said medium having directors when in the quiescent state, exhibiting from layer to layer an azimuthal twist with respect to the normal axis, whose sense of azimuthal twist with respect to the normal direction is either in right-handiness or left-handiness; and multilayer discotic compensation film having directors exhibiting an azimuthal twist through the layers of the film opposite to the sense of azimuthal twist exhibited by the directors of the liquid crystal medium when that medium is in the quiescent state wherein said compensation film is a biaxial compensation film with $n_x-n_y>0$ and either $n_x-n_z>0$ or $n_y-n_z<0$, where $n_x$, $n_y$, and $n_z$ (with the z-axis along the film normal of the twisted discotic compensation film) are the indices of refraction of the biaxial compensation film.

2. The device of claim 1, wherein the maximum azimuthal twist angle of the directors of the liquid crystal medium is substantially the same as the maximum azimuthal twist angle of the directors of the discotic compensation film with substantial alignment of the directors between corresponding layers of the film and the medium.

3. The device of claim 1, wherein the discotic compensation film comprises a liquid-crystal material from the group consisting of liquid-crystalline material and liquid crystal polymers.

4. The device of claim 1, wherein the discotic compensation film exhibits negative birefringence.

5. The device of claim 2, further comprising a polarizer layer have an absorbing axis; and an analyzer layer having an absorbing axis substantially perpendicular to the absorbing axis of the polarizer layer.

6. The device of claim 5, wherein the liquid crystal cell medium is disposed between the polarizer layer and the analyzer layer, with the discotic compensation film being from the group consisting of a film located between the polarizer layer and the liquid crystal cell medium; a film between the analyzer layer and the liquid crystal medium; and a film split along the thickness-direction into two films one on each side of the liquid crystal medium.

7. The device of claim 6, further comprising a first electrode on one of the substrates and a second electrode on the other of the substrates to apply a voltage across the liquid crystal cell medium when the electrodes are connected to a source of electrical potential.

8. The device of claim 1, wherein the discotic compensation film and the medium both have a total amount of twist of between 0 and 360°.

9. The device of claim 1, wherein the azimuthal twist through the compensation film and the liquid crystal medium both have a total amount of twist between 0 and 360°, preferably between 0 and 180°.

10. The device of claim 1, wherein the liquid crystal medium has a positive dielectric anisotropy and positive birefringence.

11. The device of claim 1, wherein the director of the boundary LC layer anchored on the inner surface of the substrate adjacent to the discotic compensation is parallel or near parallel to the director of the adjacent discotic compensation near the surface of the discotic compensation film.

12. The device of claim 1, wherein the absolute value of retardation of said liquid crystal cell 1 is from about 0.01 $\mu$m to about 3 $\mu$m, and preferably from 0.1 to 2 $\mu$m.

13. The device of claim 1, wherein said compensation film is an arbitrary number of uniaxial compensation films of positive or negative birefringence with optical axis either parallel to or perpendicular to the film plane located, within the twisted discotic compensation film, at any place between the polarizer and the analyzer.

14. A compensation film for a display device for viewing at various angles with respect to a normal axis, the display device having a multilayer liquid crystal cell medium between two substrates, said medium directors exhibiting from layer to layer an azimuthal twist with respect to the normal axis, whose sense of azimuthal twist with respect to the normal direction is either in right-handiness or left-handiness, said compensation film comprising a multilayer discotic compensation film with liquid crystal directors exhibiting an azimuthal twist through the layers of the film opposite to the sense of azimuthal twist exhibited by the directors of the liquid crystal medium when that medium is in the quiescent state wherein said compensation film is a biaxial compensation film with $n_x-n_y>0$ and either $n_x-n_z>0$ or $n_y-n_z>0$, where $n_x$, $n_y$, and $n_z$ (with the z-axis along the film normal of the twisted discotic compensation film) are the indices of refraction of the biaxial compensation film.

15. The film of claim 14, wherein the maximum azimuthal twist angle of the directors of the liquid crystal medium is substantially the same as the maximum azimuthal twist angle of the directors of the discotic compensation film with substantial alignment between directors of the film and the medium.

16. The film of claim 14, wherein the discotic compensation film comprises a liquid crystal material from the group consisting of liquid crystalline material and liquid crystal polymers.

17. The film of claim 14, wherein the discotic compensation film exhibits negative birefringence.

18. The film of claim 14, further comprising a polarizer layer having an absorbing axis; and an analyzer layer having an absorbing axis substantially perpendicular to the absorbing axis of the polarizer layer.

19. A liquid crystal display for viewing at different angles with respect to a normal axis perpendicular to the display comprising;

a. a polarizer layer having an absorption axis and a transmission axis perpendicular to the absorption axis;

b. an analyzer layer having an absorption of axis substantially perpendicular to the absorption axis of the polarizer layer and a transmission axis perpendicular to the absorption axis of the analyzer layer;

c. a liquid crystal cell medium disposed along a substrate plane between the polarizer layer and the analyzer layer which liquid crystal cell medium has liquid crystal directors exhibiting a small pretilt angle from the substrate plane and an azimuthal twist angle through the liquid crystal medium with respect to an axis perpendicular to the substrate plane;

d. a first electrode proximate to the first side of the liquid crystal cell medium, a second electrode proximate to the second side of the liquid crystal cell medium, wherein the first and second electrodes apply a voltage across the liquid crystal cell medium; and e. a multilayer discotic compensation film having directors exhibiting an azimuthal twist through the layers of the film opposite to the sense of the azimuthal twist exhibited by the directors of the liquid crystal cell medium when the medium is in its quiescent state wherein said compensation film is a biaxial compensation film with $n_x-n_y>0$ and either $n_x-n_z>0$ or $n_y-n_z>0$, where $n_x$, $n_y$, and $n_z$ (with the z-axis along the film normal of the twisted discotic compensation film) are the indices of refraction of the biaxial compensation film.

20. A display device for viewing at various angles with respect to a normal axis, the display device including two different liquid crystal materials one of said two different liquid crystal materials one material forming a liquid crystal medium of a plurality of liquid crystal cells between two substrates, and the second of the two materials a compensation film for the liquid crystal cells, said display device being characterized by:

a first of said two different materials having directors when in the quiescent state, exhibiting from layer to layer an azimuthal twist with respect to the normal axis, whose sense of azimuthal twist with respect to the normal direction is either in right-handiness or left-handiness; and a second of said two different materials being a discotic material having directors exhibiting an azimuthal twist through the layers of the film opposite the sense of azimuthal twist exhibited by the directors of the liquid crystal medium when that medium is in the quiescent state so that the maximum azimuthal twist angle of the directors of the liquid crystal medium is substantially the same as the maximum azimuthal twist angle of the directors of the compensation film with substantial alignment of the directors between corresponding layers of the film and the medium wherein said second of the films is a biaxial film with $n_x-n_y>0$ and either $n_x-n_z>0$ or $n_y-n_z>0$, where $n_x$, $n_y$, and $n_z$ (with the 2 axis along the film normal of the twisted discotic film) are indices of refraction of the biaxial film.

21. The device of claim 20, wherein the discotic material comprises a liquid crystal material from the group consisting of liquid-crystalline material and liquid crystal polymers.

22. The device of claim 20, wherein the discotic material exhibits negative birefringence.

23. The device of claim 22, wherein the absolute value or retardation of the discotic compensation film is from about 0.01 $\mu$m to about 3 $\mu$m, and preferably from 0.1 to 2 $\mu$m.

24. A display device for viewing at various angles with respect to a normal axis, the display device comprising:

a multilayer liquid crystal cell medium between two substrates, said medium having directors when in the quiescent state, exhibiting from layer to layer an azimuthal twist with respect to the normal axis, whose sense of azimuthal twist with respect to the normal direction is either in right-handiness or left-handiness; and multilayer discotic compensation film having directors exhibiting an azimuthal twist through the layers of the film opposite to the sense of azimuthal twist exhibited by the directors of the liquid crystal medium when that medium is in the quiescent state wherein the maximum azimuthal twist angle of the directors of the liquid crystal medium is substantially the same as the maximum azimuthal twist angle of the directors of the discotic compensation film with substantial alignment of the directors between corresponding layers of the film and the medium, wherein the absolute value of retardation of said liquid crystal cell is equal or approximately equal to the absolute value of retardation of the discotic compensation film.

25. A display device for viewing at various angles with respect to a normal axis, the display device comprising:

a multilayer liquid crystal cell medium between two substrates, said medium having directors when in the quiescent state, exhibiting from layer to layer an azimuthal twist with respect to the normal axis, whose sense of azimuthal twist with respect to the normal direction is either in right-handiness or left-handiness wherein the LC cell is a single-domain twisted nematic cell with a total twist angle between 0 and 360°; and multilayer discotic compensation film having directors exhibiting an azimuthal twist through the layers of the film opposite to the sense of azimuthal twist exhibited by the directors of the liquid crystal medium when that medium is in the quiescent state.

26. A display device for viewing at various angles with respect to a normal axis, the display device comprising:

a multilayer liquid crystal cell medium between two substrates, said medium having directors when in the quiescent state, exhibiting from layer to layer an azimuthal twist with respect to the normal axis, whose sense of azimuthal twist with respect to the normal direction is either in right-handiness or left-handiness wherein the cell is a two-domain or divided-domain twisted nematic cell with a total twist angle of each domain between 0 and 360°; and multilayer discotic compensation film having directors exhibiting an azimuthal twist through the layers of the film opposite to the sense of azimuthal twist exhibited by the directors of the liquid crystal medium when that medium is in the quiescent state.

27. A display device for viewing at various angles with respect to a normal axis, the display device comprising:

a multilayer liquid crystal cell medium between two substrates, said medium having directors when in the quiescent state, exhibiting from layer to layer an azimuthal twist with respect to the normal axis, whose sense of azimuthal twist with respect to the normal direction is either in right-handiness or left-handiness;

a polarizer layer having an absorbing axis; a light scattering layer; and a quarter-wave plate; and multilayer discotic compensation film having directors exhibiting an azimuthal twist through the layers of the film opposite to the sense of azimuthal twist exhibited by the directors of the liquid crystal medium when that medium is in the quiescent state.

28. The device of claim 27, wherein the discotic compensation film is disposed between the quarter-wave plate and the liquid crystal cells which each have a transparent front electrode and a reflective rear electrode for applying voltage across the liquid crystal medium.

29. A display device for viewing at various angles with respect to a normal axis, the display device comprising:

a multilayer liquid crystal cell medium between two substrates, said medium having directors when in the quiescent state, exhibiting from layer to layer an azimuthal twist with respect to the normal axis, whose sense of azimuthal twist with respect to the normal direction is either in right-handiness or left-handiness;

a polarizing beam splitter; and a quarter-wave plate; and multilayer discotic compensation film having directors exhibiting an azimuthal twist through the layers of the film opposite to the sense of azimuthal twist exhibited by the directors of the liquid crystal medium when that medium is in the quiescent state wherein the maximum azimuthal twist angle of the directors of the liquid crystal medium is substantially the same as the maximum azimuthal twist angle of the directors of the discotic compensation film with substantial alignment of the directors between corresponding layers of the film and the medium.

30. The device of claim 29, wherein the discotic compensation film is disposed between the quarter-wave plate and the liquid crystal cells that have a transparent front electrode and a reflective rear electrode to apply voltage across the liquid crystal medium.

* * * * *